(12) United States Patent
Epstein et al.

(10) Patent No.: US 10,885,101 B2
(45) Date of Patent: *Jan. 5, 2021

(54) ITERATIVE IMAGE SEARCH ALGORITHM INFORMED BY CONTINUOUS HUMAN-MACHINE INPUT FEEDBACK

(71) Applicants: Sydney Nicole Epstein, Dix Hills, NY (US); Paul Lawrence Epstein, Dix Hills, NY (US)

(72) Inventors: Sydney Nicole Epstein, Dix Hills, NY (US); Paul Lawrence Epstein, Dix Hills, NY (US); Luka Maric, Zagreb (HR)

(73) Assignees: Sydney Nicole Epstein, Dix Hills, NY (US); Paul Lawrence Epstein, Dix Hills, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,693

(22) Filed: Mar. 25, 2019

(65) Prior Publication Data

US 2019/0220479 A1 Jul. 18, 2019

Related U.S. Application Data

(63) Continuation of application No. 15/054,979, filed on Feb. 26, 2016, now Pat. No. 10,268,702, which is a (Continued)

(51) Int. Cl.
*G06Q 30/00* (2012.01)
*G06F 16/583* (2019.01)
*G06Q 30/06* (2012.01)
*G06F 16/951* (2019.01)
*G06F 16/532* (2019.01)
*G06F 16/58* (2019.01)

(52) U.S. Cl.
CPC .......... *G06F 16/583* (2019.01); *G06F 16/532* (2019.01); *G06F 16/58* (2019.01);
(Continued)

(58) Field of Classification Search
CPC ...... G06F 16/583; G06F 16/58; G06F 16/532; G06F 16/951; G06Q 30/0623; G06Q 30/0625; G06Q 30/0631
(Continued)

(56) References Cited

U.S. PATENT DOCUMENTS 6,604,103 B1 8/2003 Wolfe
9,152,624 B1 10/2015 Krallman
(Continued)

OTHER PUBLICATIONS

Milicevic et al.: "Social tagging in recommender systems: a survey of the state-of-the-art and possible extensions", Springer Science+Business Media B.V. 2010; Jan. 21, 2010; 24 pgs.
(Continued)

*Primary Examiner* — Robert M Pond
(74) *Attorney, Agent, or Firm* — Nixon Peabody LLP

(57) ABSTRACT

System and computer-implemented image search engine of analyzing tags associated with a sequence of images presented to a user to present a current object of interest of the user is disclosed. An image from among a plurality of images is presented on an electronic display. The image is associated with a set of tags. An input is received indicating a user's preference for the image. A plurality of tags is processed based on the preference and the set of tags to determine a next set of tags from the plurality of tags. A next image is determined from the plurality of images based on the next set of tags. The next image represents a physical object, different from a physical object represented by the previous image. A sequence of images is generated by repeating the above process with the next image in place of the previous image for present a user's current object of interest.

10 Claims, 12 Drawing Sheets

Related U.S. Application Data continuation-in-part of application No. 14/827,205, filed on Aug. 14, 2015, now Pat. No. 9,323,786.

(60) Provisional application No. 62/037,788, filed on Aug. 15, 2014.

(52) U.S. Cl.
CPC ....... *G06F 16/951* (2019.01); *G06Q 30/0623* (2013.01); *G06Q 30/0625* (2013.01); *G06Q 30/0631* (2013.01)

(58) Field of Classification Search
USPC .................................................. 705/26, 27
See application file for complete search history.

(56) References Cited

U.S. PATENT DOCUMENTS

| | | |
|---|---|---|
| 2007/0078832 A1 | 4/2007 | Ott, IV |
| 2007/0266025 A1 | 11/2007 | Wagner |
| 2008/0147611 A1* | 6/2008 | Bennett .................. G06Q 30/00 |
| 2009/0254534 A1 | 10/2009 | Garbow |
| 2010/0121807 A1 | 5/2010 | Perrier |
| 2011/0208617 A1 | 8/2011 | Weiland |
| 2012/0072302 A1 | 3/2012 | Chen |
| 2012/0084731 A1 | 4/2012 | Filmen |
| 2012/0316960 A1 | 12/2012 | Yang |
| 2013/0151612 A1 | 6/2013 | Dunn |
| 2014/0143086 A1* | 5/2014 | Birsin ................ G06Q 30/0631 705/26.7 |
| 2016/0048537 A1 | 2/2016 | Epstein |

OTHER PUBLICATIONS

International Search Report and Written Opinion of the International Searching Authority, PCT/US2015/045391, dated Oct. 28, 2015, 7 pgs.

International Search Report and Written Opinion of the International Searching Authority, PCT/US17/19674, dated May 19, 2017, 9 pgs.

\* cited by examiner

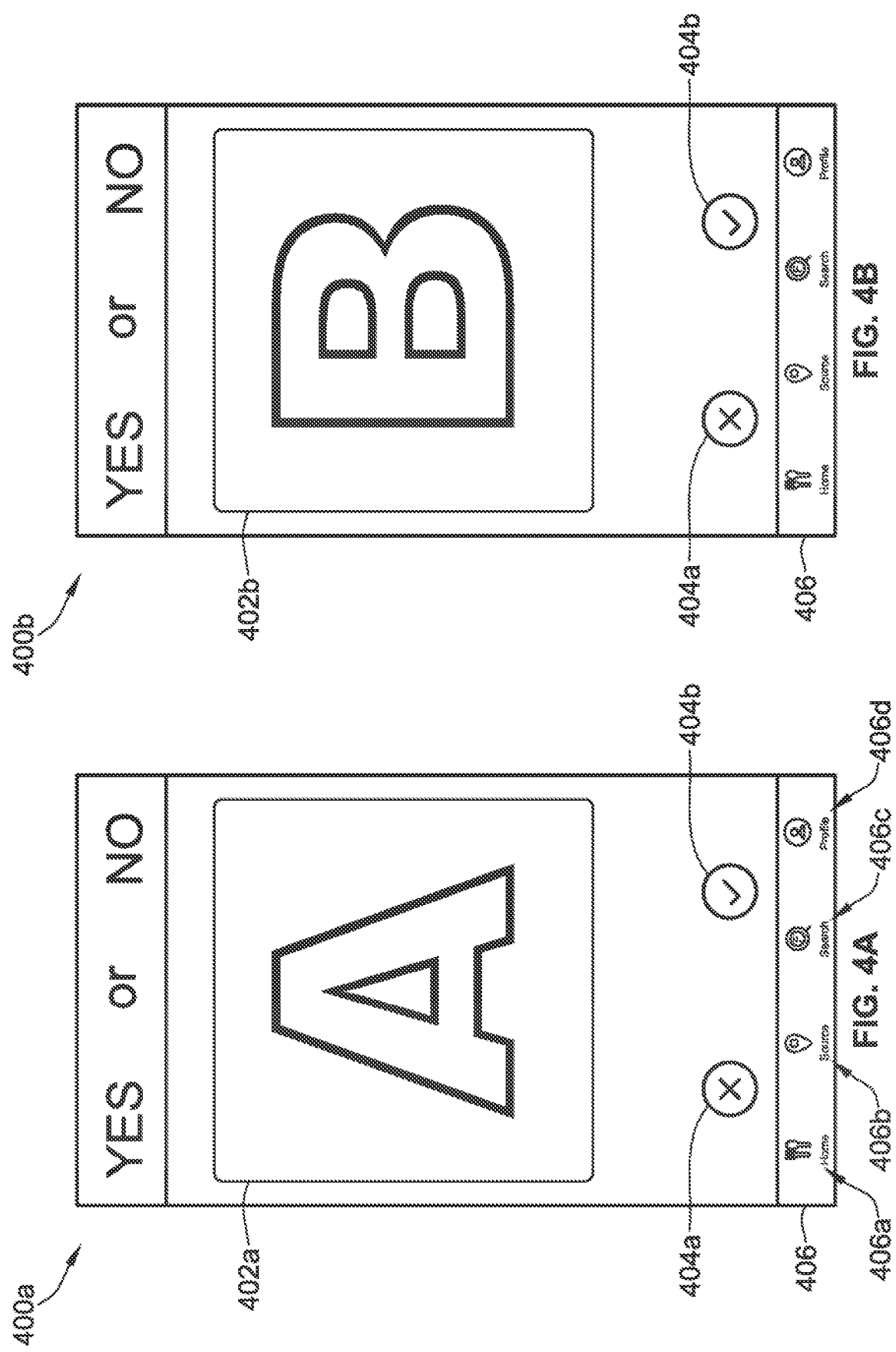

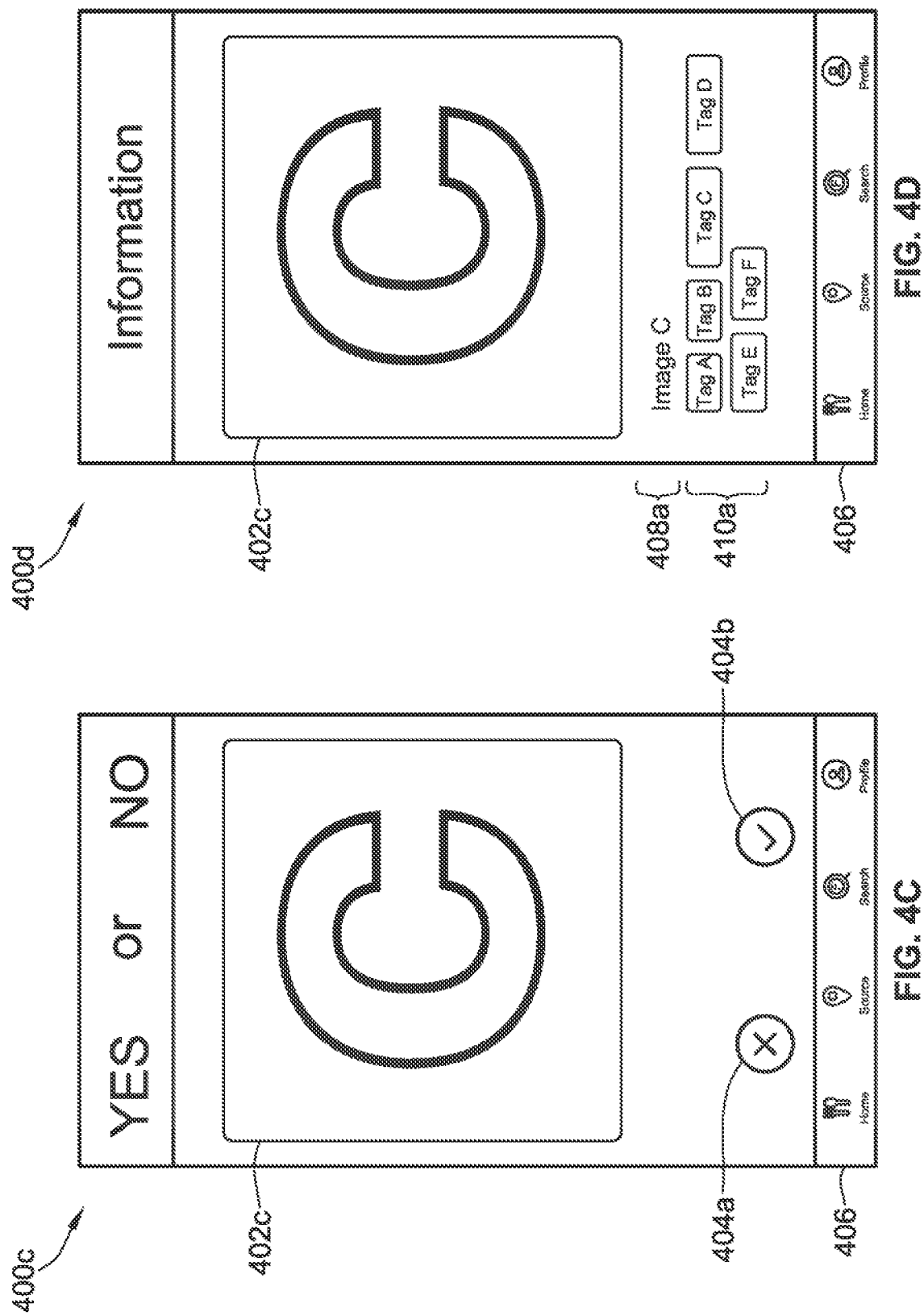

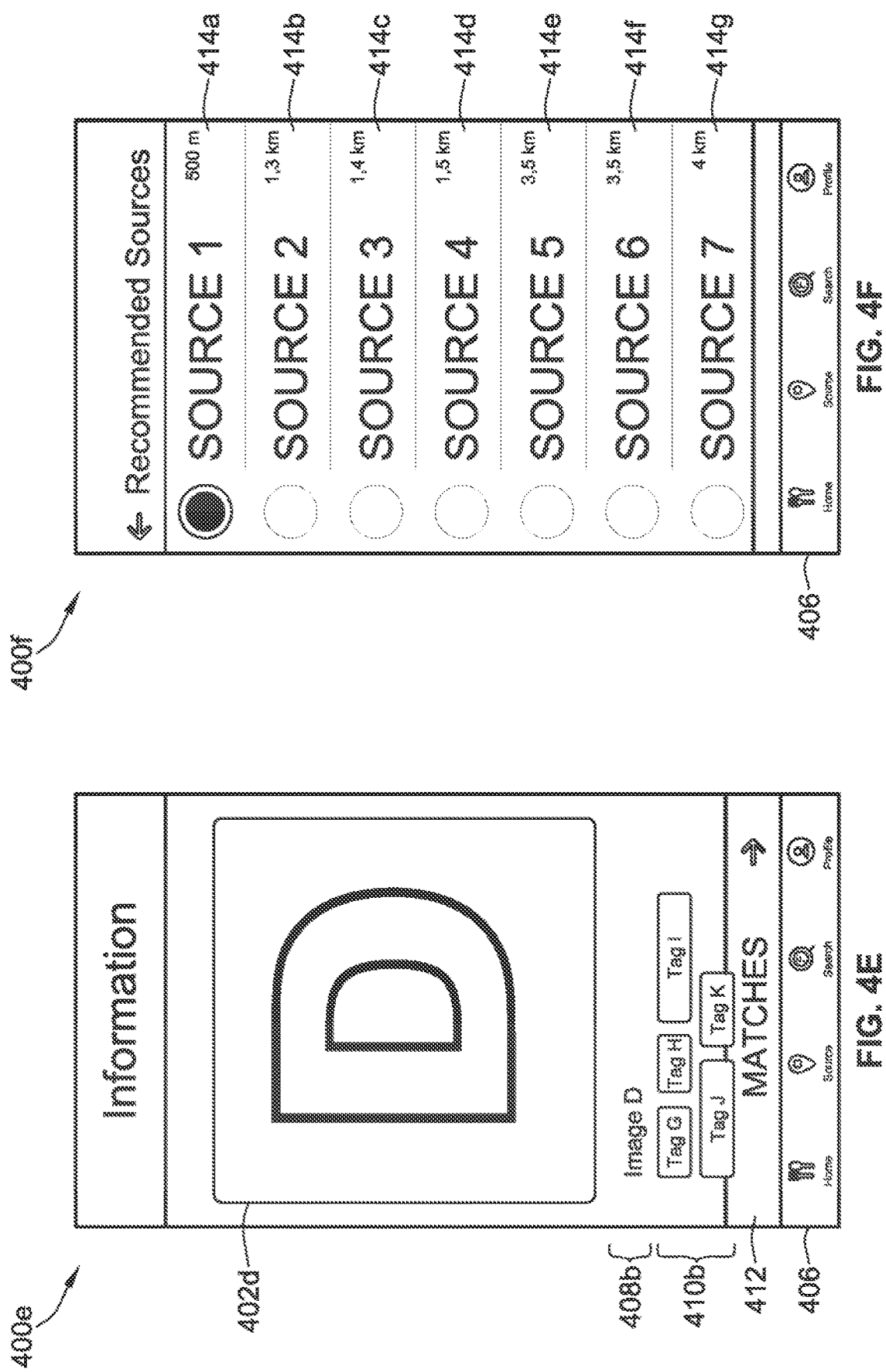

ITERATIVE IMAGE SEARCH ALGORITHM INFORMED BY CONTINUOUS HUMAN-MACHINE INPUT FEEDBACK

CROSS-REFERENCE TO RELATED APPLICATIONS

This application is a continuation of U.S. Non-Provisional application Ser. No. 15/054,979, filed Feb. 26, 2016, now allowed, which is a continuation-in-part of U.S. Non-Provisional application Ser. No. 14/827,205, filed Aug. 14, 2015, now U.S. Pat. No. 9,323,786, issued on Apr. 26, 2016, which claims priority to and the benefit of U.S. Provisional Application No. 62/037,788, filed Aug. 15, 2014, each of which is hereby incorporated by reference herein in its entirety.

FIELD OF THE PRESENT DISCLOSURE

Aspects of the present disclosure relate generally to systems and methods of analyzing tags associated with a sequence of images presented to a user to guide a user to a current object or item of interest.

BACKGROUND

Conventional image search engines rely exclusively upon the user to input into the search engine words or an image describing or depicting what the user is searching for. The results are therefore only as good as the input. Moreover, conventional image search engines put before the user a large number of images, which the user must then sift through to see if an image describing or depicting what the user was searching for is in the search results. This type of searching relies exclusively upon the human user to enter words or upload an image that already describes or depicts what the user is searching for. The search results then shift the burden to the user to sift through the results, often hundreds or even thousands of images, to see whether a relevant hit has been located. If the search results are not relevant, which the user often discovers after looking through a page or more of image thumbnails, then the user must re-enter a new search, perhaps with different words or a different starting image, and the previously downloaded images are disregarded but often remain in memory. This is an extremely inefficient way to search for and locate an image that depicts an item of interest to the user. This search consumes extensive network bandwidth by downloading to the user's device many images, requires extensive temporary memory to store the images, and consumes extensive processing resources particularly if the user needs to input multiple search terms to find an image of interest. For users who are not precisely certain what they are searching for or how to articulate precisely how to identify what they are looking for, or who do not input a machine-optimal combination of words or terminology, the search results often will not produce meaningful results. Persistent users will try again and maybe again, usually after sifting through hundreds or thousands of hits, but this comes at the expense of network, memory, and computing resources not to mention frustration to the user.

Moreover, conventional image search algorithms do not have a mechanism for "surprising" the user with an image that might be of interest to them but are not within the parameters of the originally inputted search parameters. Surprising images can be returned, but only due to linguistic homonyms or other similarities in the inputted search parameter with the image attributes located by the search engine. Some users do not know precisely what they are looking for until it is presented to their eyes, at which time they realize this image represents something of interest to them. One way to do this would be to serve up randomly selected images, but this would be pure guesswork, resulting in outlandish or bizarre outliers that have no thoughtful relationship or logical relevance to a current interest of a user. Inspiration can be visual and arrives only when the user's senses are triggered by something familiar. Conventional search engines do not allow such perspectives to emerge. In other words, conventional engines ask the user to tell the machine what the user is looking for, and the machine dutifully reports images that represent what the machine believes to be similar based on the precise search parameters inputted by the user. There is no search engine that allows the user to begin from an uncertain or ill-defined starting point and then guides that user through a journey of discovery that arrives at what the user is actually interested in by soliciting continuous feedback from the human user and thereby facilitating mutual interaction among the human and the machine.

In addition, there exist a multitude of software applications that attempt to make recommendations for users based on analyzing a user's history. A user's history can include or reflect, for example, choices the user previously made based on the user's preferences. Although a user's preferences can be constant as a whole over a long period of time, the generality of the preferences allow for a user's current specific preference or interest to be less defined. For example, a user's current preferences can be more granular or initially ill-defined compared to what can be captured by electronic recommendation systems that rely on analyzing a user's history to make a current recommendation at a specific moment in time when the user may be desiring something in particular. Thus, the granularity, subjectivity, or arbitrariness of a user's current, specific preference also allows for specific current objects or items of interest that cannot accurately be predicted based on a user's history alone. Therefore, current software applications or search engines do not help a user determine what the user's current object or item of interest is despite having access to the user's history. Moreover, although the user may know that he or she wants something, the particular object of the user's interest may be unknown even to the user until one of the user's senses is inspired or provoked. Further, thinking by the user of what the users' current object of interest is, alone, may not help the user in defining his or her current object of interest.

According to aspects of the present disclosure, a system and computer-implemented method are disclosed that guide a user to his or her current object of interest based on a sequential presentation of images one at a time representative of possible physical objects of interest.

SUMMARY

A computer-implemented search algorithm displays one image at a time to a user and continuously receives from the user feedback on the displayed image to inform the next image to be displayed to arrive very quickly at a result that represents something the user is searching for. This result could be something (an object or item, for example) that the user wants or likes, or is interested in, or has a preference for, or desires, or that otherwise engenders positive or favorable affections or emotions in the user. In short, it answers the question posed by the user, what am I looking for right now?

The user may not even know the answer to this question when the search is started, but the algorithm selects a starting image from the user's expressed preferences, and then iterates by displaying one image at a time in response to feedback from the user for each image as to whether the user liked or did not like the content of the image. A key to the invention is how the algorithm processes tags associated with images or groups of images differently depending on the user's input regarding a particular image, and optionally in combination with a specific tag weighting schema described herein. The content portrayed in each image can be tagged with many different tags that describe the content objectively or characterize the content in some subjective manner, such as based on an emotive or attitudinal characteristic. While the details of the tag processing are described in more detail below, in essence, a negative indication by the user about the content portrayed in an image results in a removal by the algorithm of the particular tag combination associated with the negatively indicated image. This means that during the search session, no image associated with the exact same tag combination will ever be displayed again. In the case of a positively indicated image, the algorithm retains the combination of tags associated with that image, adds another tag to the retained combination to make a new tag combination, and searches for the next image having the new tag combination. The starting or initial set of tags at the start or initiation of a search session can be based upon the user's expressed preferences. By processing tags differently based on the user's input, the image search algorithm can operate very quickly to locate the next image. Its simplicity saves significant computing, memory, and bandwidth resources yet results in a highly accurate search methodology that very quickly iterates to an image having content that represents something the user desires or wants at that given instant.

The algorithm displays one image at a time to the user's device. More than one image may be downloaded to the user's device, but only one is presented on the user's display at a time. This means that while the user's device awaits the user's input, at least two images can be downloaded to the user's device, one to cover a negative input, and the other to cover a positive input. This image queuing results in nearly no perceivable latency to the user as they conduct the search session, because the next image to be displayed is already either in the process of being downloaded or is already downloaded to the user's device by the time the user makes a positive or negative indication for the current image being displayed. By queuing up images for display one at a time on the user's device, significant computer network resources are saved and far less memory space is required on the user's device compared to a common search that yields many results and returns a host of images.

The image search session stops when the user so indicates, meaning that the image currently being displayed has content that the user desires, or after a certain number of images have been displayed or the user has negatively responded to a certain number of images. In the latter case, the user can start a new image search session. In the case where the session has concluded with an image having content desired by the user, the algorithm shows the user a list of locations or a map of locations where the image can find the content portrayed on the image. This allows the user to satisfy or experience immediately whatever interest, desire, curiosity, or craving strikes that user at that particular moment.

An aspect of the present disclosure includes a computer-implemented method that includes determining, by the one or more computer devices, a plurality of tags specific to a user, from among a pool of tags, based on each tag of the plurality of tags specific to the user being associated with a profile of the user. The method further includes transmitting, from the one or more computer devices, one electronic image, from among a plurality of electronic images stored on the one or more computer devices, to the electronic device. The one electronic image represents a physical object and is associated with one set of tags from the plurality of tags specific to the user. Each tag of the one set of tags describes or characterizes attributes of the physical object represented by the one electronic image. The method further includes receiving, from the electronic device, an input from the user indicating a preference for the physical object represented by the one electronic image. The method also includes processing, by the one or more computer devices, the plurality of tags specific to the user based on the preference and the one set of tags to determine a next set of tags from the plurality of tags. The method further includes determining, by the one or more computer devices, a next image from the plurality of images associated with the next set of tags. The next image represents a physical object that is different from the physical object represented by the one image, and the next set of tags describes or characterizes attributes of the physical object represented by the next image. The method also includes generating a sequence of images by repeating the presenting, the receiving, the processing, and the determining with the next image in place of the one image during a session of presenting the current object of interest of the user.

An additional aspects of the present disclosure includes one or more computer-readable, non-transitory, storage media encoding machine-readable instructions that, when executed by one or more computers, cause operations to be carried out. The operations include determining, by the one or more computer devices, a plurality of tags specific to a user, from among a pool of tags, based on each tag of the plurality of tags specific to the user being associated with a profile of the user. The operations further include transmitting, from the one or more computer devices, one electronic image, from among a plurality of electronic images stored on the one or more computer devices, to the electronic device. The one electronic image represents a physical object and is associated with one set of tags from the plurality of tags specific to the user. Each tag of the one set of tags describes or characterizes attributes of the physical object represented by the one electronic image. The operations further include receiving, from the electronic device, an input from the user indicating a preference for the physical object represented by the one electronic image. The operations also include processing, by the one or more computer devices, the plurality of tags specific to the user based on the preference and the one set of tags to determine a next set of tags from the plurality of tags. The operations further include determining, by the one or more computer devices, a next image from the plurality of images associated with the next set of tags. The next image represents a physical object that is different from the physical object represented by the one image, and the next set of tags describes or characterizes attributes of the physical object represented by the next image. The operations also include generating a sequence of images by repeating the presenting, the receiving, the processing, and the determining with the next image in place of the one image during a session of presenting the current object of interest of the user.

Another aspect of the present disclosure includes a computer-implemented method that includes receiving, from an electronic device associated with a user, an indication of an instance of an application executed on the electronic device. The application, together with one or more computer devices, is configured to direct the user to a current object of interest. The method further includes determining, by the one or more computer devices, a plurality of tags specific to the user, from among a pool of tags, based on each tag of the plurality of tags specific to the user being associated with a profile of the user. The method also includes causing a presentation on a display of the electronic device of one electronic image, from among a plurality of electronic images stored on the one or more computer devices. The one electronic image represents a physical object and is associated with one set of tags from the plurality of tags specific to the user. Each tag of the one set of tags describes or characterizes attributes of the physical object represented by the one electronic image. The method further includes processing, by the one or more computer devices, the plurality of tags specific to the user to determine a first potential set of tags corresponding to a positive preference from the user for the physical object represented by the one electronic image and a second potential set of tags corresponding to a negative preference from the user for the physical object represented by the one electronic image, prior to receiving an input from the user indicating a preference for the physical object. The method further includes transmitting, from the one or more computer devices, a first potential electronic image and a second potential electronic image, prior to receiving the input from the user indicating the preference for the physical object. The first potential electronic image is associated with the first potential set of tags and the second potential electronic image is associated with the second potential set of tags. The method also includes receiving, from the electronic device, the input from the user indicating the preference for the physical object represented by the one electronic image. The method further includes causing, by the one or more computer devices, a presentation of the first potential electronic image or the second potential electronic image based on the preference for the physical object represented by the one electronic image being the positive preference or the negative preference. The method further includes generating a sequence of electronic images presented to the user one at a time on the display of the electronic device by repeating the processing, the transmitting, the receiving the input form the user, and the causing of the presentation of the first potential electronic image or the second potential electronic image in place of the one electronic image. Generating the sequence directs the user to the current object of interest during a session of the instance of the application executed on the electronic device.

Additional aspects of the present disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 4A illustrates a user interface of a computer-implemented method or process of analyzing tags associated with a sequence of images presented to a user to present a current object of interest of the user according to aspects of the present disclosure.

FIG. 4B illustrates another user interface of a computer-implemented method or process of analyzing tags associated with a sequence of images presented to a user to present a current object of interest of the user according to aspects of the present disclosure.

FIG. 4C illustrates another user interface of a computer-implemented method or process of analyzing tags associated with a sequence of images presented to a user to present a current object of interest of the user according to aspects of the present disclosure.

FIG. 4D illustrates another user interface of a computer-implemented method or process of analyzing tags associated with a sequence of images presented to a user to present a current object of interest of the user according to aspects of the present disclosure.

FIG. 4E illustrates another user interface of a computer-implemented method or process of analyzing tags associated with a sequence of images presented to a user to present a current object of interest of the user according to aspects of the present disclosure.

FIG. 4F illustrates another user interface of a computer-implemented method or process of analyzing tags associated with a sequence of images presented to a user to present a current interest of the user according to aspects of the present disclosure.

DETAILED DESCRIPTION

Figure 1:
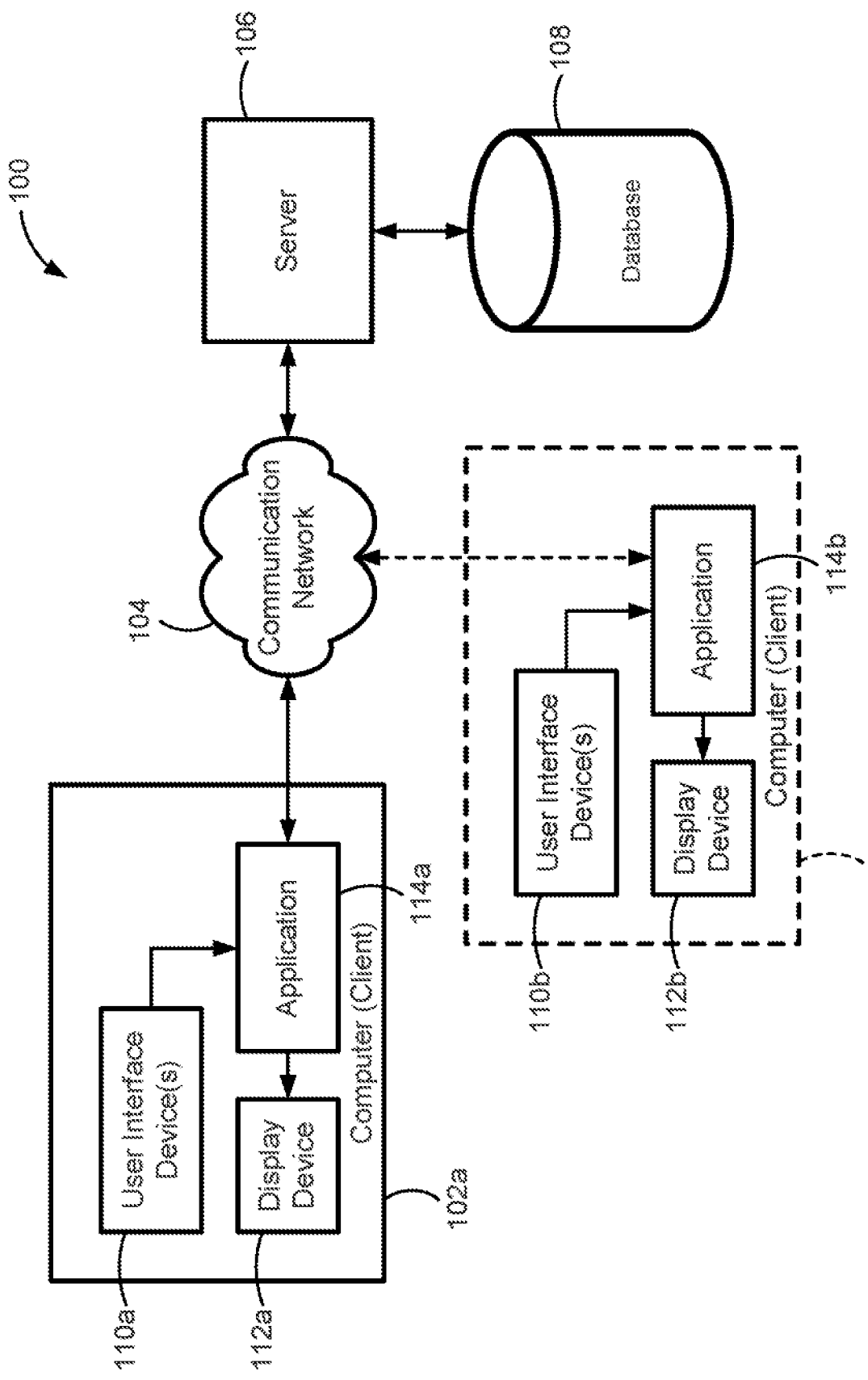
FIG. 1 is a functional block diagram of a computer system according to an aspect of the present disclosure.

While this disclosure is susceptible of embodiment in many different forms, there is shown in the drawings and will herein be described in detail example implementations of the inventions and concepts herein with the understanding that the present disclosure is to be considered as an exemplification of the principles of the inventions and concepts and is not intended to limit the broad aspect of the disclosed implementations to the examples illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

A (software) module can refer to computer-readable object code that executes a software sub-routine or program, which corresponds to instructions executed by any microprocessor or microprocessing device to perform described functions, acts, or steps. Any of the methods or algorithms or functions described herein can include non-transitory machine or computer-readable instructions for execution by: (a) an electronic processor, (b) an electronic controller, and/or (c) any other suitable electronic processing device. Any algorithm, software module, software component, software program, routine, sub-routine, or software application, or method disclosed herein can be embodied as a computer program product having one or more non-transitory tangible medium or media, such as, for example, a flash memory, a CD-ROM, a floppy disk, a hard drive, a digital versatile disk (DVD), or other electronic memory devices, but persons of ordinary skill in the art will readily appreciate that the entire algorithm and/or parts thereof could alternatively be executed by a device other than an electronic controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.).

As discussed above, there currently exist recommendation systems that are unable to account for a user's current (i.e., contemporaneous) interest or preference based on the breadth of the user's interest, despite, for example, the recommendation systems having access to information regarding the user's history. The granularity of a user's current preference relative to, for example, a user's historical preferences with respect to the subject matter relating to the preference prohibits current recommendation systems from being able to estimate or present the user's current object or item of interest at the moment in time the user may be craving something. The terms object and item herein are interchangeable. At best, current recommendation systems merely provide a one-time guess regarding the user's current preference. Moreover, current applications exist that provide information regarding broad categories of physical or tangible objects that are available within the user's current location. However, the amount of information provided by such applications may amount to information overload. The information overload does not allow a user to determine a specific physical object in which the user is currently interested. What is needed, inter alia, is a guided, iterative searching solution that repeatedly and dynamically adjusts searching criteria in response to human-machine inputs made by the user to arrive at a recommendation that will satisfy the user's contemporaneous craving at the conclusion of the search session. In this way, both human and machine are necessary partners in this search strategy. Only the human can, using his or her subjective senses, ascertain from an image how a user fees about what is presented in the image. However, to satisfy an immediate craving, the machine is needed to help the human user arrive at a recommendation quickly, within less than a minute or so. The Internet, cellular data and wireless technology, and smartphones have given users instant access and visibility to a myriad of options, but in some respects, this access and visibility is as much a blessing as it is a curse. With so many choices and options readily available, a new programmed machine is needed to help users find relevant information quickly to satisfy needs that are fleeting and must be satisfied quickly.

Accordingly, aspects of the present disclosure provide for systems and methods of analyzing tags associated with a sequence of images presented to a user one at a time to guide a user to a current object of interest (in the form of an electronic photograph displayed on the user's electronic device). Each electronic image (e.g., electronic photograph) represents a physical object that the user can obtain or experience through or at a physical source that provides the physical object or an experience depicted in the electronic image. Each electronic image within the sequence is associated with a set of tags that describe or characterize the physical object or attributes of or associated with the physical object. Based on a user's preference (e.g., positive or negative or a continuum in between) for each image, a new electronic image is presented to generate the sequence of images. The new image is selected based on the set of tags associated with the image that describe the physical object represented by the image, and how the set of tags for the new image relate to the set of tags for the previous image based on the preference of the previous image. The sequence of presenting images to the user that represent physical objects continues to guide the user into determining a physical object that satisfies or describes or is relevant to the user's current object of interest. Once the user is presented with an image that represents a physical (tangible) object or experience that the user is currently interested in (e.g., craving), the systems and methods allow for the user to select the image (e.g., a digital photograph) and obtain information on how to obtain the corresponding physical object of interest or to experience what is depicted in the selected image.

FIG. 1 is a functional block diagram of a system 100 according to an aspect of the present disclosure. First, the general components of the system 100 will be introduced, followed by examples. The system 100 includes one or more electronic computers (clients) 102*a*, 102*b*. Reference numbers used herein without a letter can refer to a specific one of the plurality of items, a subset of multiple items of the plurality of items, or all items of the plurality of items so numbered with the same reference number. Thus, by way of example, the reference number 102 can refer to the computer 102*a*, the computer 102*b*, or both of the computers 102*a* and 102*b*, as shown in FIG. 1. The one or more computers 102*a*, 102*b* connect to a communication network 104, such as the Internet. However, the communication network 104 can be any type of electronic communication network. A computer as used herein includes any one or more electronic devices having a central processing unit (CPU) or controller or microprocessor or microcontroller as understood by those skilled in the art of electronic computers. Examples of computers include tablet computers, laptop computers, desktop computers, servers, smartphones, a wearable electronic device such as a watch, an eyeglass, an article of clothing, or a wristband, and personal digital assistants (PDAs). The term computer as used herein can include a system of electronic devices coupled together to form what is conventionally referred to as a computer. For example, one or more electronic input devices, such as a keyboard or a mouse, and one or more electronic display devices, such as an electronic video display, can be coupled to a housing that houses the CPU or controller. Or, all components of the computer can be integrated into a single housing, such as in the case of a tablet computer or a smartphone. The one or more computers 102a, 102b conventionally include or are operatively coupled to one or more electronic memory or storage devices that store digital information therein, including non-transitory machine-readable instructions and electronic data.

The one or more computers 102a, 102b include electronic user interface devices 110a, 110b. Each user interface device 110a, 110b corresponds to a human-machine interface (HMI) that accepts inputs made by a human (e.g., via touch, click, gesture, voice, etc.) and converts those inputs into corresponding electronic signals. Non-limiting examples of user interface devices 110a, 110b include a touchscreen, a keyboard, an electronic mouse device, an electronic camera or other imaging device, and a microphone. These are also referred to as human-machine interface devices, because they allow a human to interact with a machine by providing inputs supplied by the human user to the machine.

The one or more computers 102a, 102b also include electronic display devices 112a, 112b that are configured to display information that can be visually perceived. Non-limiting examples of display devices 112a, 112b include an electronic video display, a stereoscopic display, or any electronic display configured to visually portray information including text, static graphics, and moving animations that is perceivable by the human eye. The electronic display devices 112a, 112b display visual information contained in an electronic user interface (UI). The electronic UI can also include selectable elements that are selectable using the one or more HMI devices 110a, 110b. Thus, the electronic UI generally can include a graphical user interface (GUI) component and a human-machine user interface component, via which a human user can select selectable elements displayed on the GUI via the HMI interface.

The one or more computers 102a, 102b also include software applications 114a, 114b. That is, the one or more computers 102a, 102b execute non-transitory machine-readable instructions and data that implement the software applications 114a, 114b. The applications 114a, 114b perform one or more functions on the one or more computers 102a, 102b. The applications 114a, 114b can be various specific types of applications, such as a web browser application or a native application. Within the system 100, the applications 114a, 114b convey information between the one or more computers 102a, 102b and the communication computer network 104 (e.g., Internet) via a conventional wired or wireless electronic communications interface associated with the one or more computers 102a, 102b. Alternatively, or in addition, the applications 114a, 114b can be a native application. Native applications convey information between the one or more computers 102a, 102b over the communication network 104 to an application server 106. The native applications 114a, 114b conventionally convey information between the one or more computers 102a, 102b over the communication network 104 via a conventional wired or wireless electronic communications interface associated with the one or more computers 102a, 102b.

As described above, the server 106 is also coupled to the communication network 104. The server 106 is a type of computer, and has a well understood meaning in the art. The server 106 can be, for example, a web browser server, such as in the case of applications 114a, 114b being web browser applications. Or, the server 106 can be, for example, a native application server, such as in the case of applications 114a, 114b being native applications.

An electronic database 108 is incorporated in or is coupled to the server 106. The database 108 is a form of a memory device or a data store, and stores electronic data for retrieval and archival relative to the server 106. Both the server 106 and the one or more applications 114a, 114b communicate information according to one or more protocols, such as the hypertext transfer protocol (HTTP) in the case of the communication network 104 being the Internet. In the case of the communication network 104 being a private local area network (LAN), instead of the Internet, any other communications protocol can be used instead of the HTTP. For example, native applications can instead communicate using a proprietary or conventional communications protocol to pass information between the one or more computers 102a, 102b and the server 106.

Although the system 100 is shown generally with respect to FIG. 1 as including two computers 102a, 102b, one server 106, and one database 108, the system 100 can include any number of computers 102a, 102b, any number of independent or clustered servers 106 (e.g., server farm or sever cluster), and any number of databases 108. Moreover, some or all functionality of one or more components of the system 100 can be transferred, in whole or in part, to other components of the system 100. By way of example, functionality of the server 106 and/or the database 108 can be transferred, in whole or in part, to the one or more computers 102a, 102b, depending on the functionality and performance of the computers 102a, 102b.

The applications 114a, 114b communicate with the server 106 and the database 108 over the communication network 104 for analyzing tags associated with a sequence of images presented to a user to guide a user to a current object or experience of interest. The applications 114a, 114b control the user interface devices 110a, 110b and the display devices 112a, 112b to present (e.g., display) the electronic images to the user and to receive inputs from the user indicating the user's preferences for the images. The images are communicated over the communication network 104 to the applications 114a, 114b of the one or more computers 102a, 102b from the database 108, either directly or through the server 106. Accordingly, based on a client-server arrangement of the system 100, with the computers 102a, 102b as the clients and the server 106 as the server, the database 108 stores the information used for analyzing tags associated with a sequence of images presented to a user to guide a user to a current object of interest. The server 106 performs the functionality of the algorithms described herein, including serving the information from the database 108 to the clients (e.g., computers 102a, 102b). The computers 102a, 102b present the information to the user and receive the inputs from the users, which are then presented to the server 106 for processing. However, the functionality disclosed herein with respect to the disclosed algorithms can be divided among the components of the system 100 differently than as explicitly disclosed, without departing from the present disclosure. For example, all of the functionality disclosed herein can be embodied in one or more of the computers 102a, 102b, such as the computers 102a, 102b being arranged as a distributed network, depending on the capability of the computers 102a, 102b.

As one facet of the information, the database 108 electronically stores the electronic images within a data store of images. The images can be of various file formats and image types. By way of example, the file formats can include JPEG, Tagged Image File Format (TIFF), Portable Network Graphics (PNG), etc. The image types can include digital photographs, digital drawings, icons, etc. As discussed above, the images stored on the database 108 represent a physical object that may be of interest to the user (e.g., the user may be craving). Accordingly, the images visually convey information to the user so that the user understands the physical objects that the images represent. The system 100 can initially include a set number of images. The set number of the images can be defined by the administrator of the system 100. As described below, the system 100 also allows for users to add additional images to the system 100. For example, users can upload images from the one or more computers 102a, 102b to add additional images to the database 108. As the users interact with the system 100, and the users upload images to the system 100, the number of images increases.

For each image, the database 108 stores information regarding the physical object that the image represents. The physical object or item can be any physical (tangible) object or item that is representable by an image or can depict an experience such that a user can identify or perceive the physical object or experience when presented the image.

The database 108 also stores electronic tags. Primary tags are used within the system 100 to describe and/or characterize the physical object that is represented by an image. The primary tags can include single words or several words linked together as a tag that describe or characterize the physical object overall, or that describe or characterize sub-components or sub-aspects (e.g., attributes) of the physical object. Accordingly, for each image, the image is associated with a set of tags that describe or characterize the physical object. The database 108 stores all of the tags within a pool of tags, which is the totality of tags that can be associated with an image to describe a characteristic and/or a quality of the physical object that is represented by the image. The primary tags can be any type of descriptor of the physical object represented by the image. In some aspects, the primary tags can describe subcomponents of the physical objects. The tags can also identify or describe the specific physical object, item, or experience.

The tags can be objective, subjective (or semi-subjective), or tangential regarding how the tags describe or characterize the physical object that is associated with the image. The examples of primary tags provided above are objective tags that directly describe the physical objects. The tags may additionally include tags that are at least partially subjective and/or tangentially describe the physical objects. With respect to physical objects for purposes of example, subjective or semi-subjective tags may apply to the physical object for one user but not necessarily all users. Tangential tags may describe aspects of the physical object only when correlated with other information. Such other information may only be known or apply to a subset of users that interact with the system 100. By way of example, such tags may be terms currently trending in social media, such as hashtags on TWITTER® that apply to only a subgroup of users that are following the current social media trends. Such tags include, for example, hipster, yolo, GenY, GenX, etc. Independent of the context of the tag, these tangential tags do not necessarily apply to a physical object. However, patterns may develop that allow certain tangential tags to be understood as referring to a quality or characteristic of a physical object.

Like the images, the system 100 initially begins with a certain number of tags. However, the group of tags can be dynamic and evolve as the users interact with the system 100. For example, additional tags can be added to the pool of tags as users upload new images of physical objects to the system 100 and describe the physical objects based on new tags that the users create. The users can create additional tags to describe or characterize the physical object that is associated with the image that the users uploaded. Each image is associated with one or more of the tags from among the group of tags as a set of tags for the image. The association can be based on an administrator of the system 100 associating the tags with the images. Alternatively, or in addition, the association can be based on users of the system 100 associating the tags with the images and/or creating new tags. The association based on the users can be manual, such as the users manually selecting a tag to associate with an image. Alternatively, or in addition, the association can be automatic, such as the system 100 automatically determining tags that apply to images. Based on the images being associated with multiple tags as a set of tags, the database 108 also stores information pertaining to specific sets of tags. A specific combination of tags is a set of tags. A single set of tags can describe multiple different images based on the generality of each tag and an image being associated with any number of tags. The database 108 may include a data structure, such as a table, to track the various sets of tags based on the various associations between tags and images within the database 108.

The database 108 also stores and tracks associations between elements of the system 100, such as between tags, between sets of tags, between images and tags and/or sets of tags, between users and the elements, etc. The system 100 can associate a tag with an image based on the image already being associated with another tag, and both of the tags including an association. By way of example with respect to physical objects, an image may represent a an object A that includes a component B. The image may already be associated with the tag A but not be associated with the tag B. Based on an association developed by the system 100 tracking usage of the tag A with the tag B, in addition to, for example, other users liking other images that are tagged with both tags A and B, the system 100 can automatically determine to associate the tag B with the image based on the image being associated with the tag A. The associations can develop as the number of images that represent different physical objects increases within the database 108, or as more users interact with the tags and with the images. For example, as more users upload images to the system 100, the users may associate both of the tags A and B to the newly uploaded images. The system 100 tracks the continued association of the tag A with the tag B and logs the association within the database 108.

The tags may be divided into two overall categories, such as primary tags and secondary tags. Primary tags are defined by an administrator of the system 100. The primary tags include tags that directly describe or characterize the physical object. The system 100 at least initially includes primary tags. The system 100 can also initially include secondary tags. The secondary tags are defined by the administrator of the system 100 and/or by users of the system 100. The secondary tags may identify the same characteristic and/or quality as the primary tags, or the secondary tags may identify different characteristics and/or qualities as the primary tags. Secondary tags may directly describe or characterize the physical object, such as with primary tags. In addition, secondary tags may subjectively describe or characterize the physical objects, or may tangentially describe or characterize the physical objects as described above.

Each image is associated with at least one primary tag, but can be associated with any number of primary tags and secondary tags. Some images may be associated with only one primary tag. Some images may be associated with many different tags.

The systems and methods of analyzing tags associated with a sequence of images presented one at a time to a user to guide a user to a current object of interest relies on a plurality of tags that is associated with a user being processed based on a previous set of tags of an image and a preference for that image from the user. Accordingly, the database 108 may store, or the server 106 may dynamically generate, a plurality of tags that are a subset of all of the tags (e.g., pool of tags) that are stored on the database 108. The plurality of tags includes not only the tags but also the sets of tags that correspond to the images that are covered by one or more of the tags. As will be described in greater detail below, the plurality of tags may be tags that apply or are relevant to a user, such as tags within the pool of tags that match tags associated with a user's profile. As the user is presented with images and provides preferences in response to the images, the plurality of tags evolves as certain tags are removed (or not considered) and/or certain sets of tags are removed (or not considered) from the plurality of tags.

The database 108 also stores user profiles. Generally, the user profiles include information that is used for interacting with the system 100. Such information can include certain tags indicated by the user to include with the user's profile, images, physical objects, and/or entities for which the user has indicated a positive or a negative preference, independent of or dependent of the user interacting with images presented to the user during a session of analyzing tags associated with a sequence of images presented to a user to guide a user to a current object of interest. The information can include tags and images that apply to certain physical objects that the user prefers (e.g., likes), and certain physical objects that the user does not prefer (e.g., dislikes). The user can indicate such preferences through a manual selection of the tags. Alternatively, or in addition, such preferences can be learned by the system 100 during the user's interaction with the system 100 over a period of time, such as through an implicit selection of the tags as preferred tags through the user indicating over time a preference for the tags. The preference can be indicated according to a YES/NO schema, such as the user does or does not like a tag, an image, and/or a physical object. Alternatively, the preference can be indicated according to a weighted schema, such as a degree to which the user does or does not like a tag, image, and/or physical object. The profile information can include any other additional information associated with a user, such as the user's name, address, gender, age, ethnicity, religion, etc. The system 100 tracks such additional information to mine trends across the users for tags, images, and/or physical objects. For example, the system 100 tracks user's interactions within the system 100 to develop a user history. The user history tracks interactions between the user and the system 100 and allows the user to review the previous interactions. By way of example, the user history can include information pertaining to the user's preference to specific images that were previously presented to the user.

According to some embodiments, the user profiles can include objects to avoid or that the user expressly dislikes.

The database 108 can automatically translate the entered negative indications into negative preferences for certain tags, images, and/or physical objects to which the negative indications apply so that images depicting any negatively indicated objects are not presented to the user. As discussed above, the physical objects represent objects that are provided by various sources. The database 108 includes information with respect to the location of the sources associated with the physical objects and/or the images that represent the sources. By way of example, the database 108 includes information with respect to the location that provides the physical object or experience. In addition to the location, the database 108 can also include source profiles. The source profiles allow users to browse the sources of the objects and click on a suggested or profiled source, leading the user to the source's profile. As part of the above-described associations, the system 100 collects and shares visitor frequency with sources when users are redirected to the entities' websites following selection of images associated with physical objects that are associated with the entities.

Figure 2A:
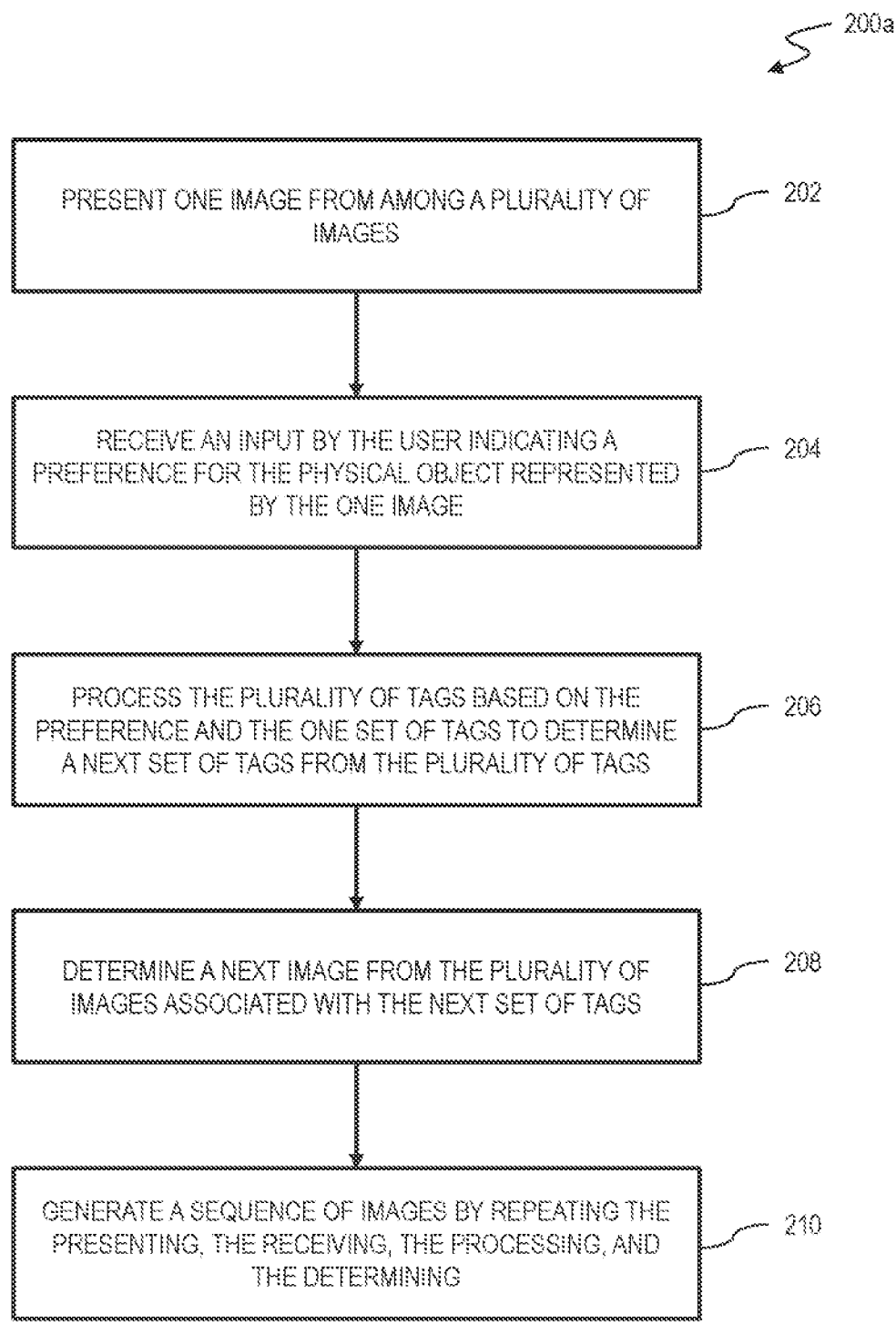
FIG. 2A is a flowchart of a computer-implemented method or algorithm of analyzing tags associated with a sequence of images presented to a user to present a current object or item of interest of the user according to aspects of the present disclosure.

FIG. 2A is a flowchart of a computer-implemented method or algorithm 200a of analyzing tags associated with a sequence of images presented to a user to guide a user to a current object of interest, using aspects of the present disclosure including the one or more computers 102a, 102b, the server 106, and the database 108. The computer-implemented method or algorithm 200a may be executed within a computer 102a, the server 106, the database 108, or across multiple platforms, such as on the computer 102a and the server 106. In regard of the latter arrangement, an application 114a executed by the computer 102a (e.g., client-side application) may perform the computer-implemented method or algorithm 200a in conjunction with an application executed on the server 106 (e.g., server-side application) according to a client-server relationship. The computer-implemented method or algorithm 200a begins with a user initiating a session of the computer-implemented method or algorithm 200a. As will be described in greater detail below, the session of the computer-implemented method or algorithm 200a begins with determining a plurality of tags that are associated with the user and that will be processed to determine subsequent images to present to the user to generate a sequence of images during a session of the computer-implemented method or algorithm 200a. The plurality of tags also determines the plurality of images from which the images that are presented to the user are selected. Thus, according to some embodiments, the computer-implemented method or algorithm 200a processes only subsets of the tags and the images stored in the database 108 based on the user that initiated the session of the computer-implemented method or algorithm 200a.

The computer-implemented method or algorithm 200a begins with presenting one of the images, from among the plurality of images, to the user, such as through the display device 112a of the computer 102a (202). As described above, the image represents a physical object and is associated with a set of tags. Each of tag of the set of tags describes the physical object that is represented by the presented image. Thus, the user is presented with an image, and the user is able to recognize the physical object represented by the image.

As will be also described below, along with the image, one or more user interface elements or objects can be optionally presented on the display device 112a of the computer 102a to allow the user to indicate a preference or inclination/disinclination for the physical object that is represented by the image. The user interface elements may vary depending on the functionality/capability of the computer 102a, the user interface device 110a, and/or the display device 112a. Alternatively, the display device 112a may not present graphical user interface elements (although it could) specifically for the user indicating the preference for the physical object. Rather or additionally, for example, it may be implicit what action the user should take to indicate the preference, such as by swiping left on or near the image or anywhere on the display device 112a to indicate a negative preference (e.g., dislike) and swiping right on or near the image or anywhere on the display device 112a to indicate a positive preference (e.g., like), or vice versa. To be clear, the present disclosure also contemplates displaying graphical UI elements (e.g., like and dislike virtual buttons displayed on the display device 112 for selection using a user interface device 110), and recognizing gestures (e.g., swiping) made by a user relative to a user interface device 110, or one or the other.

Upon the image being presented (e.g., displayed on the display device 112) to the user, the computer-implemented method or algorithm 200a receives an input from the user indicating a preference for the physical object represented by the image (204). The preference may be like or an inclination toward the object (e.g., positive) or dislike or disinclination against the object (e.g., negative). Alternatively, the preference may be like (e.g., positive), dislike (e.g., negative), or neither like nor dislike (e.g., neutral). A neutral preference may indicate that the user cannot tell whether he or she likes or dislikes the physical object represented by the image. Alternatively, the preference may be scaled, such as a range of 1 to 10 to indicate the degree that the user likes (e.g., 6 to 10) or dislikes (e.g., 1 to 5) the physical object represented by the image.

The computer-implemented method or algorithm 200a then processes the plurality of tags based on the preference indicated by the user (206). Processing of tags refers to the manipulation or treatment of the tags drawn from the pool of tags by the computer or server 102, 106 during a session. The plurality of tags that is processed is the tags that are selected from the pool of tags stored within the database 108. The processing includes determining a next set of tags based on the preference the user provided in response to the previous image, and the set of tags that are associated with the previous image. The preference determines how the set of tags from the previous image is processed to determine the next set of tags. By way of example, if the preference that the user indicated in response to a previous image is positive, negative, or neutral, the plurality of tags is processed (e.g., treated) differently based on the set of tags of the previous image. In response to the preference for the physical object represented by the previous image being negative, the processing of the plurality of tags includes removing tags from the plurality of tags that correspond to the tags from the set of tags of the previous image. The tags are removed from the plurality of tags that are processed to determine the next set of tags, for each iteration of the computer-implemented method or algorithm 200a, and the remainder of the session, so that an image is not presented to the user for the remainder of the session that includes the particular tags.

Although the tags are described throughout as being removed from the plurality of tags, removal includes removing the tags from the plurality of tags and also includes leaving the tags within the plurality of tags but not considering the tags. For example, the tags can remain within the plurality of tags but the tags can be marked as, for example, removed such that the tags are not considered during the processing of the plurality of tags.

As discussed above, the tags can be categorized generally as primary tags and secondary tags. An image can be associated with both primary tags and secondary tags. According to some embodiments, the tags that are associated with an image and that are removed from the plurality of tags in response to a negative preference are only the primary tags from the set of tags associated with the image that received a negative preference. Alternatively, both the primary tags and the secondary tags from the set of tags associated with an image that received a negative preference are removed from the plurality of tags in response to a negative preference. Alternatively, whether only primary tags or both primary tags and secondary tags are removed from the plurality of tags may be determined based on the number of images that have been presented to the user. For example, if the image is one of the first N images presented to the user, where N is 3, 4, or 5, only the primary tags associated with the image are removed from the plurality of tags in response to an input by the user indicating a negative preference. However, if the image is a later image presented to the user, such as the sixth, seventh, or eighth image, both the primary tags and the secondary tags that are associated with the image are removed from the plurality of tags. For subsequent images that are presented to a user after the user has indicated a positive preference to at least one previous image, only those tags that are associated with the newly presented image and that are new relative to the previously presented set of tags are the tags that are removed from the plurality of tags, whether they are only primary tags or both primary and secondary tags.

In addition to removing tags (e.g., negative tags) that are associated with an image that the user provides a negative preference for, the computer-implemented method or algorithm 200a may also remove tags that are associated with the negative tags from the plurality of tags (e.g., associated tags). As discussed above, in addition to the tags being stored in the database 108, the database also stores associations between tags. For example, certain tags may be associated with other tags based on trends in the physical objects represented by the images. Accordingly, in response to a negative preference, the computer-implemented method or algorithm 200a may determine associated tags that satisfy a threshold association with the negative tags. The threshold for the association may be based on any number of factors or metrics, such as the number of times two tags are associated with the same image, the number of times or frequency of a user indicating a certain preference (e.g., like or dislike) for an image, and the tags that are associated with the image, etc. For example, the association may be based on the number of times two tags are associated with an image when the image is indicated by a user as having a positive preference or a negative preference. However, the threshold for determining the association may vary without departing from the spirit and scope of the present disclosure.

In response to the preference for the physical object represented by the image being positive or favorable, the processing of the plurality of tags includes determining additional tags to add to the tags from the set of tags associated with the image. The additional tags further narrow down the current object of interest of the user by building upon the tags associated with the previous image, for which the user provided a positive preference.

The additional tags may be determined according to various methods. In some aspects, the additional tags are determined randomly. Both the number of tags and the tags themselves can be determined randomly and subsequently added to the previous set of tags. In some aspects, weightings and/or associations between the tags are determined and used to determine the one or more additional tags to add to the previous set of tags. As further described below with respect to FIGS. 2B and 2C, the weightings and/or associations may be based on various factors, which may apply to all users of the system 100 or apply only to the specific user.

In some aspects, associations are determined between tags within the plurality of tags for a particular user. In the alternative, associations are determined between tags within the entire pool of tags. The associations can be based on, for example, the number of times two tags apply to the same image within the pool of images. This type of association may be considered a first-degree association. The associations can be based on, for example, the number of times three or more tags apply to the same image within the pool of images. Thus, in general, the associations are determined between the tags based on multiple tags applying to the same image, and the computer-implemented method or algorithm 200a applies the associations, in part, in determining a current object of interest of a user by determining one or more additional tags to add to the previous set of tags, where the one or more additional tags are associated with the previous set of tags. Similar to above, the threshold for the association may be based on any number of factors or metrics, such as the number of times two tags are associated with the same image, the number of times a user indicates a certain preference (like or dislike) for an image, and the tags that are associated with the image, etc. However, the threshold for determining the association may vary without departing from the spirit and scope of the present disclosure.

Upon determining one or more additional tags that are associated with one or more tags from the set of tags that are associated with an image that the user indicated a positive preference for, the computer-implemented method or algorithm 200a determines a next set of tags based on the next set of tags including at least one tag of the one or more additional tags. If there are several one or more additional tags, one, or more than one, of the one or more additional tags are selected to be in the next set of tags. The selection of which of the one or more additional tags to add to generate the next set of tags can vary. The selection can be random, such that, for example, one or more tags from a total of four additional tags are selected to be included in the next set of tags. Alternatively, the selection can be based on a weighting of the tags. The weighting of the tags is further described below with respect to FIGS. 2B and 2C.

As discussed above, the tags can be categorized generally as primary tags and secondary tags. An image can be associated with both primary tags and secondary tags. According to some embodiments, only tags within the plurality of tags that are primary tags are processed to determine additional primary tag(s) to add to the previous set of tags. Alternatively, all tags within the plurality of tags (e.g., primary and secondary) are processed to determine the additional tags to be added to the previous set of tags. Whether only primary tags or both primary tags and secondary tags are processed to determine additional tags to add to the set of tags associated with the previous image can be determined based on the number of images within a sequence that already have been presented to a user. For example, if the image is one of the first N images presented to the user, where N is 2, 3, 4, or 5, only the primary tags within the plurality of tags are processed to determine an additional tag to add to the previous set of tags. However, if the image is a later image presented to the user, such as the sixth, seventh, or eighth image within a session, both primary tags and secondary tags are processed to determine additional tags to add to the previous set of tags.

As discussed above, the preference that a user can indicate in response to being presented an image representing an object can be a positive preference or a negative preference. Additionally, the preference can be a neutral preference. In response to the preference indicated for an image being a neutral preference, the set of tags (e.g., combination of tags) that are associated with the image are stored and no set of tags (e.g., combination of tags) that include only that set of tags is subsequently presented to the user for the remainder of the session. In some aspects, the computer-implemented method or algorithm 200a creates a data table that includes sets of tags that are associated with neutral preferences of the user. In determining a next set of tags, the computer-implemented method or algorithm 200a analyzes the data table so that the next set of tags does not include a set of tags that received a neutral preference.

In some aspects, no image that is associated with each tag from a set of tags that received a neutral preference is subsequently presented to the user for the remainder of the session. Alternatively, no image that is associated with only the tags from a set of tags that received a neutral preference is subsequently presented to the user for the remainder of the session. Accordingly, in response to a neutral preference, the computer-implemented method or algorithm 200a processes the plurality of tags and determines the next set of tags based on the next set of tags not including the one set of tags corresponding to the image, either alone or, alternatively, in any combination with additional tags, for a remainder of the session. Thus, sets of tags are logged that are associated with a neutral preference to narrow down the possible next sets of tags and, therefore, images that can be presented to the user.

Upon determining the set of tags based on the preference and the set of tags for the previous image, the computer-implemented method or algorithm 200a determines the next image to present to the user (208). The next image is an image from a plurality of images that is associated with the next set of tags. Multiple images can be associated with the same set of tags. Accordingly, the computer-implemented method or algorithm 200a selects a single image from the images that share the same set of tags. The criteria of the selection of the image can vary. The selection can be random, such that a random image is selected from the images that share the same set of tags. Alternatively, the selection may be based on a process or metric. As discussed above, the database 108 stores information pertaining to how many times the user has interacted with a specific tag and/or a specific image. The process or metric can include analyzing the number of interactions between the user and the images that share the same set of tags and selecting the image that has the highest number of interactions. The image with the highest number of interactions may correspond to a high likelihood that the user has a current object of interest in the physical object represented by the image. Alternatively, the process can include selecting the image that has the lowest number of interactions with the user. The interactions can include any interaction, such as any time the user was presented the image and regardless of the preference the user provided in response to the image. Alternatively, the interactions can be limited to only interactions where the user provided a specific preference, such as a positive preference, a negative preference, or a neutral preference. Alternatively, the process or metric may be based on the source that is associated with the physical object that is represented by the image.

The computer-implemented method or algorithm 200*a* generates a sequence of images based on repeating the above process of at least presenting one image to the user and awaiting an input from the user regarding whether the user has a positive or a negative, or a neutral, preference for the physical object represented by the one image (210). The session of the computer-implemented method or algorithm 200*a* continues each time the user provides a preference for the currently presented image, and determines the next set of tags and the next image to present based on the preference for the previous image and the set of tags associated with the previous image. The human interaction with the computer-implemented method or algorithm 200*a* based on a repeated presentation (e.g., display) of one image at a time to the user, and the user providing the preferences for the one image, narrows down the physical object that the user is currently interested in based on the sets of tags associated with the images presented to the user that represent the various possible physical objects. The computer-implemented method or algorithm 200*a* continues during a session as long as the user continues to provide inputs corresponding to the user's preferences to physical objects represented by images. Thus, according to some embodiments, the computer-implemented method or algorithm 200*a* continues indefinitely or at least until the number of images and/or tags are exhausted during the session based on the processing discussed above. During the session, tags and sets of tags are removed based on negative or neutral responses, as described above. Thus, a session can end in the event that there are no more tags and/or images to present to a user. Alternatively, a single session of presenting a sequence of images can last until a predetermined number of images have been presented or displayed to the user, or until a predetermined number of inputs have been received from the user. For example, a session of presenting images can last for 10 images. If the user has not yet determined a physical object that the user is currently interested in after the $10^{th}$ image, the session ends, and the computer-implemented method or algorithm 200*a* restarts a new session. Restarting a new session of the computer-implemented method or algorithm 200*a* resets the removed tags, the sets of tags that were neutralized, or both from the previous session. For example, all of the plurality of tags and sets of tags that were initially available at the beginning of the computer-implemented method or algorithm 200*a* are again available from which to determine new sets of tags and new images to present to the user. Alternatively, the session of the computer-implemented method or algorithm 200*a* ends once the user selects an image that represents a physical object that the user is interested in, as described in more detail below.

Figure 2B:
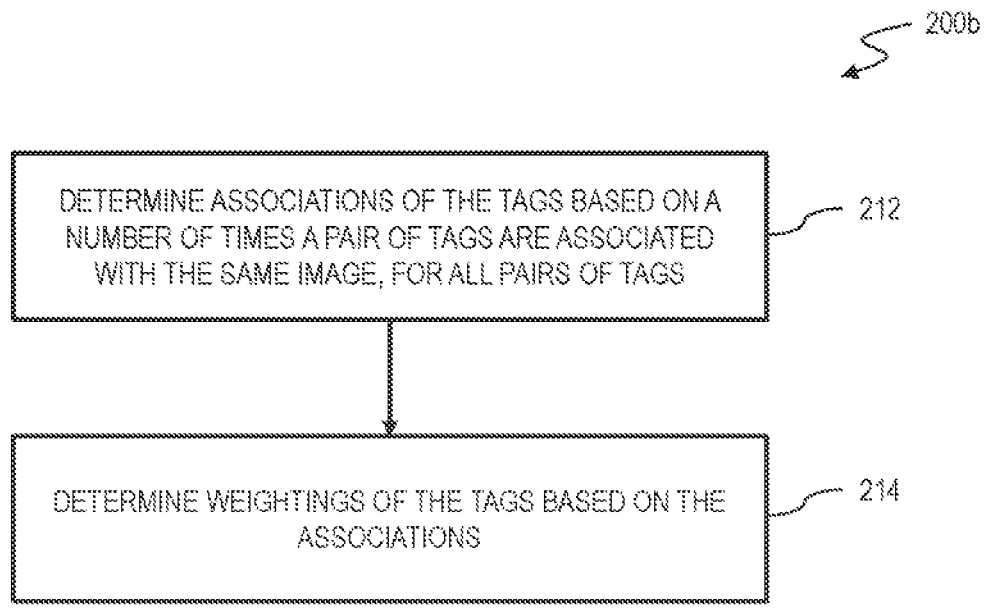
FIG. 2B is a flowchart of a computer-implemented method or algorithm of determining weightings of tags based on tag associations according to aspects of the present disclosure.

FIG. 2B is a flowchart of a computer-implemented method or algorithm of determining weightings of tags based on tag associations using aspects of the present disclosure including the computer 102*a*, the server 106, and the database 108. The computer-implemented method or algorithm 200*b* can be a separate algorithm for purposes of implementation within the system 100 compared to the computer-implemented method or algorithm 200*a*. Alternatively, the computer-implemented method or algorithm 200*b* can be an extension or a sub-routine of the computer-implemented method or algorithm 200*a*.

As discussed above, electronic tags that are added to a previous set of tags in response to a positive preference for a previous electronic image may be determined based on weightings and/or associations between the tags. To make these determinations, the computer-implemented method or algorithm 200*b* determines associations between tags based tags that are associated with same electronic image (212). The associations can be determined for all tags within the pool of tags. In such a case, the associations apply to all users of the system 100, rather than only a specific user. Alternatively, the associations can be determined for all tags within the plurality of tags that are specific to the user. In such a case, the associations apply to only the specific user, and not to all users of the system 100. The associations can be determined continuously, periodically, or on-demand, such as each time a user begins a new instance or session of an application executing on the computer-implemented method or algorithm 200*b*.

In some aspects, the associations are based on the number of times each pair of tags, from among the tags that are being considered, are associated with the same image. Thus, the more times the tags, for example, A and B appear together for the electronic images, the higher the association between A and B. Alternatively, the associations can be based on groups of three or more tags, and the number of times the groups of three or more tags are associated with the same image. According to the determination of what constitutes an association, the computer-implemented method or algorithm 200*b* determines the associations for the tags.

After determining the associations, the computer-implemented method or algorithm 200*b* determines the weightings of the tags based on the associations (214). In some aspects, the number of associations can be directly used as a weighting. For example, if the tags A and B are associated with the same image 50 times, the weighting may be 50. Alternatively, the weighting may be determined according to a further processing of the number of associations, such as a normalizing of the associations, taking the base 10 logarithm of the number of associations, etc. Once the weightings are determined, the weightings are used to determine the additional one or more tags to the added to the previous set of tags.

Because the previous set of tags that the user provided a preference for in relation to the corresponding image may have multiple tags, each tag may have a different highest-weighted tag. For example, if the previous set of tags included the tags A, C, E, and G, each of the tags A, C, E, and G may have a different highest-weighted tag. For example, the highest-weighted tags may be B, D, F, and H, respectively. In which case, the highest weighted-tag of all four highest-weight tags may be determined as the additional tag to add to the previous set of tags for generating the next set of tags, such as tag B. Alternatively, if more than one tag of the previous set of tags share the same highest-weighted tag (e.g., tag A and tag C each have tag B as their highest-weighted tag), although tag B is not the highest-weighted tag among all of the highest-weighted tags associated with the previous set of tags (e.g., tag F may have a higher weighting), tag B may nonetheless be added as the additional tag to the previous set of tags. In such a case, the weighting may be cumulative over multiple tag associations. For example, if the tag B has 50 associations each with tags A and C, and tag H has 80 associations with tag E, tag B's cumulative weighting is 100, which is greater than 80 for tag H. Thus, tag B is determined as the additional tag. By adding tags based on the weighting of tags, the process of determining a user's current object of interest may be expedited.

Figure 2C:
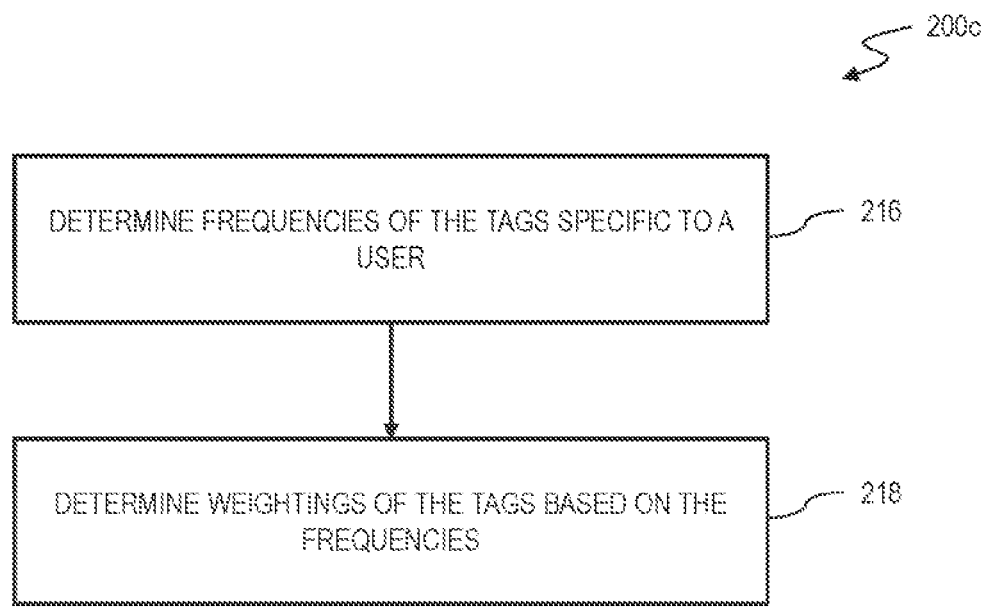
FIG. 2C is a flowchart of another computer-implemented method or algorithm of determining weightings of tags based on tag frequencies according to aspects of the present disclosure.

FIG. 2C is a flowchart of another computer-implemented method or algorithm 200*c* of determining weightings of tags based on tag frequencies using aspects of the present disclosure including the computer 102*a*, the server 106, and the database 108. The computer-implemented method or algorithm 200c can be a separate algorithm for purposes of implementation within the system 100 compared to the computer-implemented methods or algorithms 200a and 200b. Alternatively, the computer-implemented method or algorithm 200c can be an extension or a sub-routine of the computer-implemented methods or algorithms 200a and 200b.

The above-described weightings of the tags may be based on different schemes than solely on the associations between the tags. In some aspects, the weightings can be based on the specific user and the specific user's interactions with respect to the tags, generally referred to as frequencies. Thus, the computer-implemented method or algorithm 200c determines the frequencies associated with the tags (216).

In some aspects, the frequencies can be based on the number of times a tag is presented to the user. For example, each time an image is presented to the user (e.g., displayed on the display of the computer 102a), the frequencies of the tags that are associated with the image are incremented (e.g., incremented by one). In some aspects, the frequencies can be based on both the number of times a tag (e.g., based on the associated image) is presented to a user and the preference the user provided associated for the image. The frequencies can be considered based on only positive preferences, only negative preferences, or both. If a user is frequently presented images that are associated with a specific tag, and the user frequently provides a positive preference for the images, the tag is associated with a high frequency. Conversely, if a user is frequently presented images that are associated with a specific tag, and the user frequently provides a negative preference for the images, the tag is associated with a low frequency. Alternatively, the tag can be associated with no frequency if only positive preferences result in frequencies being incremented and/or logged. Thus, the computer-implemented method or algorithm 200c tracks the number of times a user interacts with a specific tag, and optionally also the corresponding preference for the presented image that is associated with the tag, and uses this information to generate a frequency for the tag.

After determining the frequencies, the computer-implemented method or algorithm 200c determines the weightings of the tags based on the frequencies (218). In some aspects, the greater the number of times a tag is presented to the user, the higher the weighting of the tag. Alternatively, in some aspects, the greater the number of times a tag is presented to a user, the lower the weighting of the tag. In some aspects, the frequencies for the tags can be directly used as a weighting. For example, if tag A is presented to the user 50 times, the weighting for tag A can be 50. If each time the tag is presented to a user and the user provides a positive preference for the tag, the weighting may be a multiple of the number of times the tag is presented, where the multiplication factor provides additional weighting for the positive preference. Alternatively, the weighting can be determined according to a further processing of the frequencies, such as a normalizing of the frequencies, taking the base 10 logarithm of the frequencies, etc. Once the weightings are determined, the weightings can be used to determine the additional one or more tags to the added to the previous set of tags.

In some aspects, the weightings of the tags are determined based on either the associations described with respect to FIG. 2B or the frequencies described with respect to FIG. 2C. In other aspects, the weightings of the tags are determined based on both of the associations in FIG. 2B and the frequencies in FIG. 2C. The combined weightings can be a straight combination such that each weighting scheme is given the same weight. Alternatively, one weighting scheme can be provided a different weight with respect to the other weighting scheme. For example, the frequencies of the tags being presented to the user, or particularly the frequency of the number of times a positive preference is associated with a tag, can be given a higher weighting than the number of associations between tags. By way of example, one tag (e.g., tag Y) may be associated with a tag in the previous set of tags 100 times through both tags being tagged in 100 images. At the same time, one tag (e.g., tag Z) may have been presented to the user 50 times in the past, and have been associated with 50 positive preferences provided by the user. Tag Z may be given a greater weight than tag Y because the weighting of tag Z applies directly to the user, whereas the weighting of tag Y applies to all users. Thus, the next set of tags, and the corresponding image that is presented to the user, is based on the previous set of tags and the addition of tag Z based on the weighting.

Figure 2D:
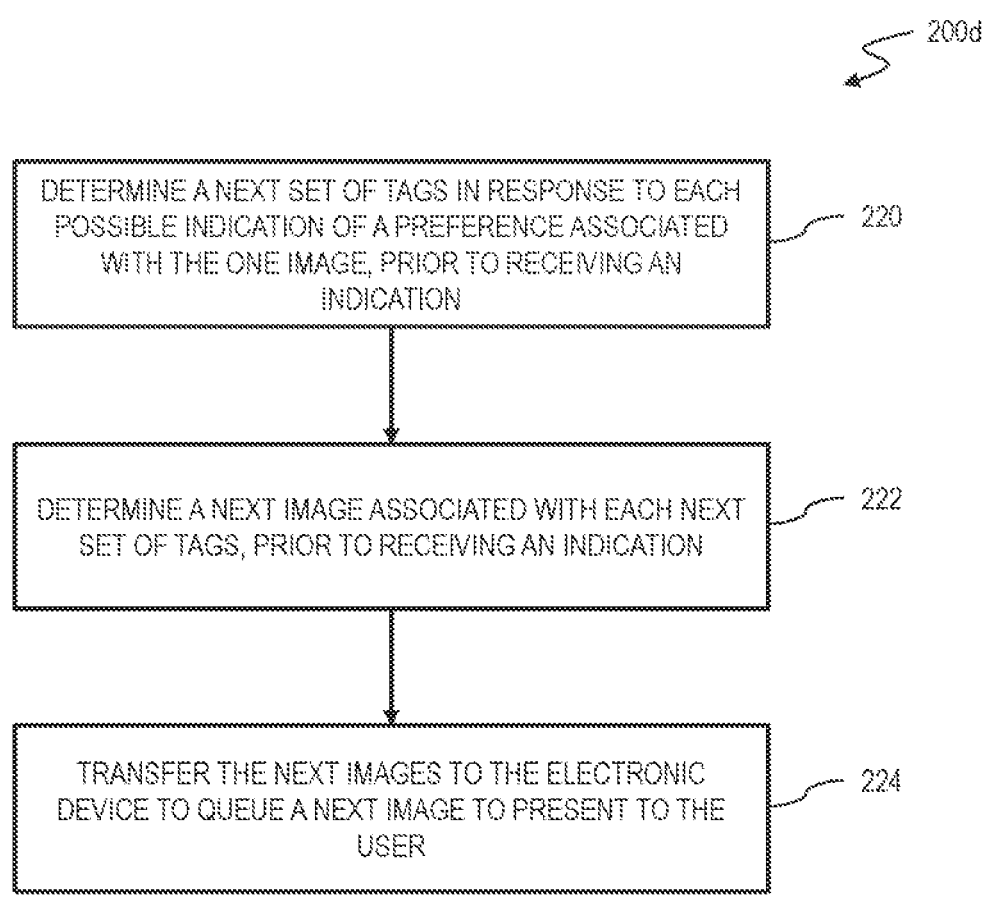
FIG. 2D is a flowchart of a computer-implemented method or algorithm of queuing one or more electronic images to present to a user according to aspects of the present disclosure.

FIG. 2D is a flowchart of a computer-implemented method or algorithm 200d for queuing one or more electronic images at the computer 102a to present to a user within the system 100, using aspects of the present disclosure including the computer 102a, the server 106, and the database 108. The computer-implemented method or algorithm 200d can be a separate algorithm for purposes of implementation within the system 100 than the computer-implemented methods or algorithms 200a-200c. Alternatively, the computer-implemented method or algorithm 200d can be an extension or a sub-routine of the computer-implemented methods or algorithms 200a-200c.

To save network and computer resources, in addition to reducing the latency between images being presented, one or more electronic images can be electronically transmitted or downloaded to the computer 102a to create a queue of the next electronic image to present to the user. However, because the next electronic image that is presented to the user is determined based, at least in part, on the user's preference of the currently presented electronic image, the exact image that will be presented (e.g., displayed) cannot be determined until the user inputs his or her preference regarding the displayed image. Accordingly, the computer-implemented method or algorithm 200d determines a next sets of tags in response to each possible indication of a preference associated with the currently presented image (220). If the possible preference indications are positive and negative, the computer-implemented method or algorithm 200d determines two next sets of tags. One of the next sets of tags corresponds to the user indicating a positive preference for the currently presented electronic image. The other of the next sets of tags corresponds to the user indicating a negative preference for the currently presented electronic. The two next sets of tags are determined as described above, and as further described below with respect to FIG. 3. However, the next sets of tags are determined prior to the user providing an indication of a preference, rather than in response to the user providing the indication, as a step in generating a queue of electronic images.

The computer-implemented method or algorithm 200d determines each next image associated with each next set of tags (222). The computer-implemented method or algorithm 200d determines the next images before the user provides the preference indication. The next images associated with each next set of tags are determined as described herein.

Once the computer-implemented method or algorithm 200d determines the next image associated with each of the next set of tags, the next images, and only the next images among the pool of images, are transferred to the computer 102a (224). The images are queued prior to the user providing the preference for the currently presented image. Accordingly, once the user provides the preference, the next image is already available and stored on the user's computer 102a and ready to be presented or displayed on a display of the user's computer 102a. Therefore, the computer-implemented method or algorithm 200d provides the next image without imposing any latency to transfer the next electronic image to the computer 102a in response to receiving the user's preference. Yet, the computer-implemented method or algorithm 200d only transmits to the computer 102a one electronic image for each possible preference. Therefore, although the user enjoys the benefit of having the next electronic image already stored on the computer 102a, so as to avoid the delay in downloading the next image, the computer 102a does not need to store a large number of electronic images. Nor does the system 100 require a large amount of data to be transmitted between the computer 102a and the server 106. Instead, the data is transmitted as needed and on demand to reduce network resources, as well as computer 102a and server 106 resources.

The computer-implemented method or algorithm 200d is contrasted with respect to conventional image search algorithms and platforms. In conventional image search algorithms and platforms, the algorithms and platforms are unable to determine the user's next action, because the user has to define the next action rather than select an action from a limited selection of actions. For example, a user using a conventional search platform must enter the search terms that define what the user is searching for. If the initial search does not return what the user is searching for, the user must manually define and update the search terms in hopes of receiving better search results. Because the user is left to manually define and update the search terms that generate the next search results, the conventional search platform cannot provide all possible search results prior to the user providing the updates to the search terms. However, because of the iterative approach of the computer-implemented method or algorithm 200d, and the user responding based on a set number of possible preferences, the computer-implemented method or algorithm 200d is able to queue up the images in response to the possible preferences. This provides for a more responsive and tailored user experience contrasted with conventional search platforms, while still minimizing the resources required at the computer 102a, the server 106, and the network therebetween. Accordingly, the computer-implemented method or algorithm 200d improves the functioning of the computer 102a, the server 106, and the network therebetween at least compared to conventional search platforms, and the computer devices and networks upon which the conventional search platforms run.

Figure 2E:
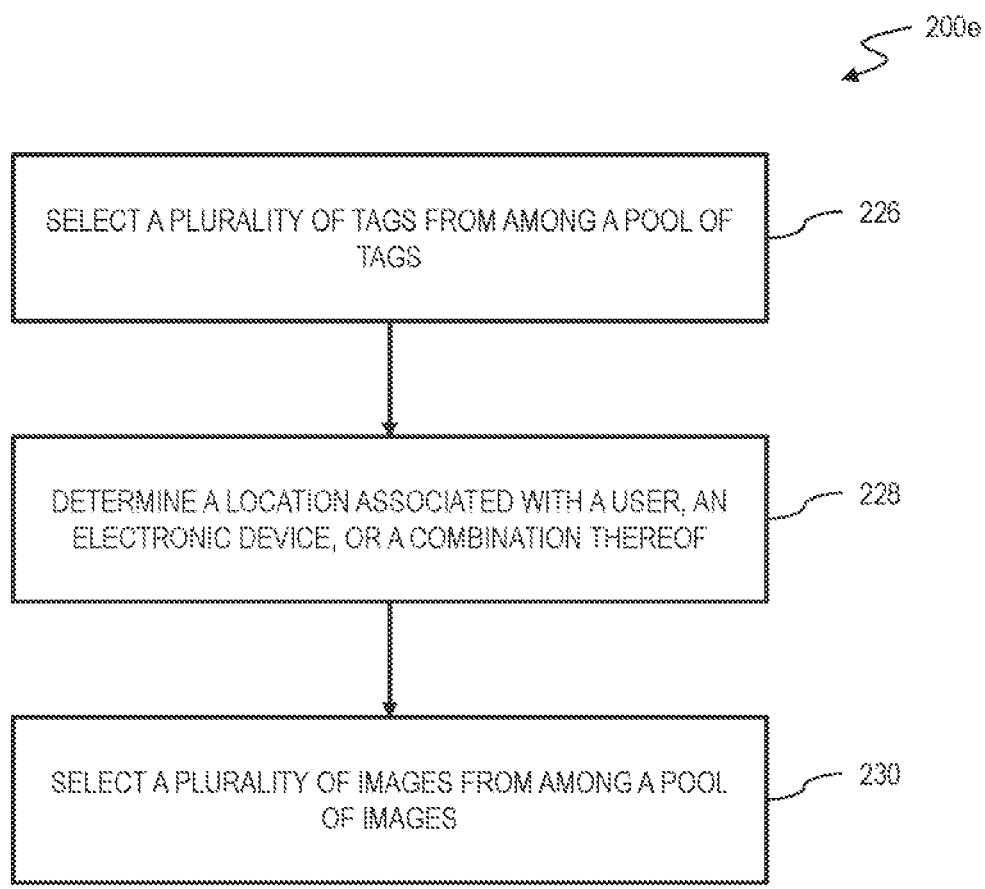
FIG. 2E is a flowchart of a computer-implemented method or algorithm of determining, from among a pool of tags and a pool images, tags and images that are relevant for a user according to aspects of the present disclosure.

FIG. 2E is a flowchart of a computer-implemented method or algorithm 200e of determining, from among the entire pool of tags and the entire pool images, the plurality of tags and the plurality of images that are relevant for the user for a particular session and that are processed and analyzed for determining images to present to the user, using aspects of the present disclosure including the computer 102a, the server 106, and the database 108. The computer-implemented method or algorithm 200e can be a separate algorithm for purposes of implementation within the system 100 than the computer-implemented methods or algorithms 200a-200d. Alternatively, the computer-implemented method or algorithm 200e can be an extension or sub-routine of the computer-implemented methods or algorithms 200a-200d.

The computer-implemented method or algorithm 200e selects the plurality of tags that are processed for determining the next set of tags, discussed above in the computer-implemented method or algorithm 200a, and from which an initial image is presented, from among the pool of tags within the database 108 (226). The plurality of tags is selected based on the plurality of tags matching one or more tags associated with a profile of the user. Thus, tags that are relevant to a user, according to the tags matching tags that are within the user's profile, are selected to be within the plurality of tags that are processed as discussed above in the computer-implemented method or algorithm 200a. The tags that are selected are tags that have an exact match with tags within a user's profile. Alternatively, the tags that are selected are tags that have an exact match or that satisfy a threshold association with tags within the user's profile. The association can be based on any association described herein, such as the tags typically being associated with the same image based on trends of images and tags within the database 108. The tags that are selected from among the pool of tags can be only primary tags, or the tags can be both primary tags and secondary tags. In some examples, primary and secondary tags have an equal weight, but in other examples, a primary tag can have a higher weight compared to a secondary tag.

The computer-implemented method or algorithm 200e also determines a location associated with the user, the computer 102a that is executing the application to perform the computer-implemented method or algorithm 200e, or a combination thereof (228). The location associated with the computer 102a can be determined automatically based on various functionality of the computer 102a, such as a GPS (global positioning system) receiver within the computer 102a. Alternatively, the location associated with the user and the computer 102a can be determined based on the user manually entering a location within the computer 102a. The location manually entered by the user can be a current location or a different location, such as a location that a user plans on being at during a certain time.

Based on the plurality of tags that are selected from the pool of tags, and the location of the user and/or the computer 102a, the computer-implemented method or algorithm 200e selects images from among the pool of images (230). The images are selected based on the images being associated with at least one tag of the plurality of tags that are selected from the pool of tags. Further, the images are selected based on each image being associated with the location of the user and/or the computer 102a. Based on the computer-implemented method or algorithm 200e, the processing of the tags and the selection of the images within the computer-implemented method or algorithm 200a is limited to the tags that are relevant to the user and to the images that represent physical objects that are local to a specific location (e.g., current geographic location of user and/or computer 102a, or planned/expected location of the user and/or computer 102a).

The first image presented during a session of the computer-implemented method or algorithm 200a is an image within the pool of images. By way of example, the first image is randomly selected from among the plurality of images as a first image of the sequence of images. Alternatively, the first image can be an image from among the plurality of images that is associated with a high number of interactions with the user, either through direct interactions between the user and the image, such as the user indicating a preference in response to being presented an image, or through interactions between one or more tags associated with the image and the user. Alternatively, the first image presented to the user within a session of the computer-implemented method or algorithm 200a can be based on a search by the user for a specific tag, physical object, or source that provides the physical object. For example, the user can elect to begin a session of the computer-implemented method or algorithm 200a and enter the name of the physical object they seek. In response, the computer-implemented method or algorithm 200a searches for images within the database 108 containing one or more tags describing the physical object, enabling the user to search his or her geographic area for sources of that physical object.

Figure 2F:
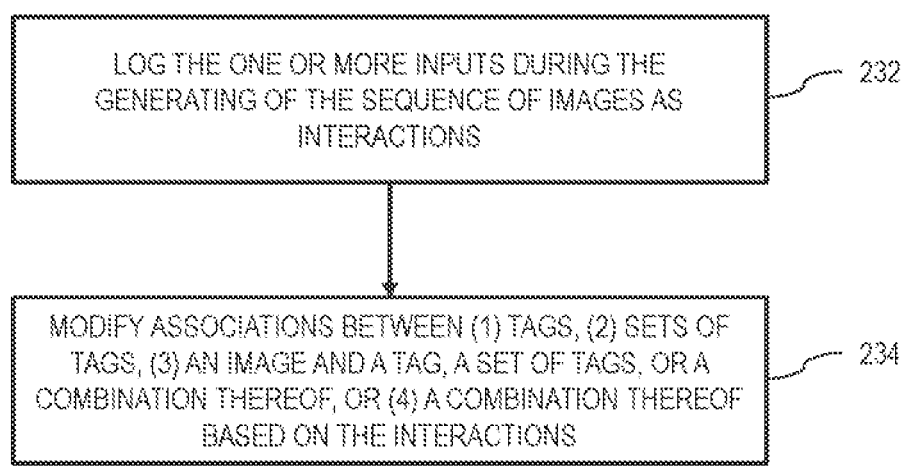
FIG. 2F is a flowchart of a computer-implemented method or algorithm of updating and/or modifying associations between elements within the system according to aspects of the present disclosure.

FIG. 2F is a flowchart of a computer-implemented method or algorithm 200f of determining and/or updating associations between elements within the system 100, using aspects of the present disclosure including the computer 102a, the server 106, and the database 108. The computer-implemented method or algorithm 200f can be a separate algorithm for purposes of implementation within the system 100 than the computer-implemented methods or algorithms 200a-200e. Alternatively, the computer-implemented method or algorithm 200f can be an extension or a sub-routine of the computer-implemented methods or algorithms 200a-200e.

During a session of generating a sequence of images by the computer-implemented method or algorithm 200a, the computer-implemented method or algorithm 200f logs the inputs from the user as interactions (232). The inputs are logged as interactions with the tags, the sets of tags, the images, the physical objects, and/or the entities associated with the physical objects for which the inputs apply. When a user provides an input of a preference associated with an image, the input is logged as applying to the image, the physical object represented by the image, one or more tags associated with the image, and/or the source associated with the physical object. The input can be logged relative to only the user, or the input can be logged across all users.

The logging of the inputs allows the computer-implemented method or algorithm 200f to modify associations between the various informational elements within the system 100 (234). For example, the logging allows the computer-implemented method or algorithm 200f to modify associations between tags, between sets of tags, and/or between an image and a tag and/or a set of tags based on the interactions. The associations can be modified relative to the user making the inputs, or the associations can be applied to all users. Accordingly, the associations discussed and used with the computer-implemented methods or algorithms discussed above are dynamic and constantly evolving based on the continued user inputs.

Figure 3:
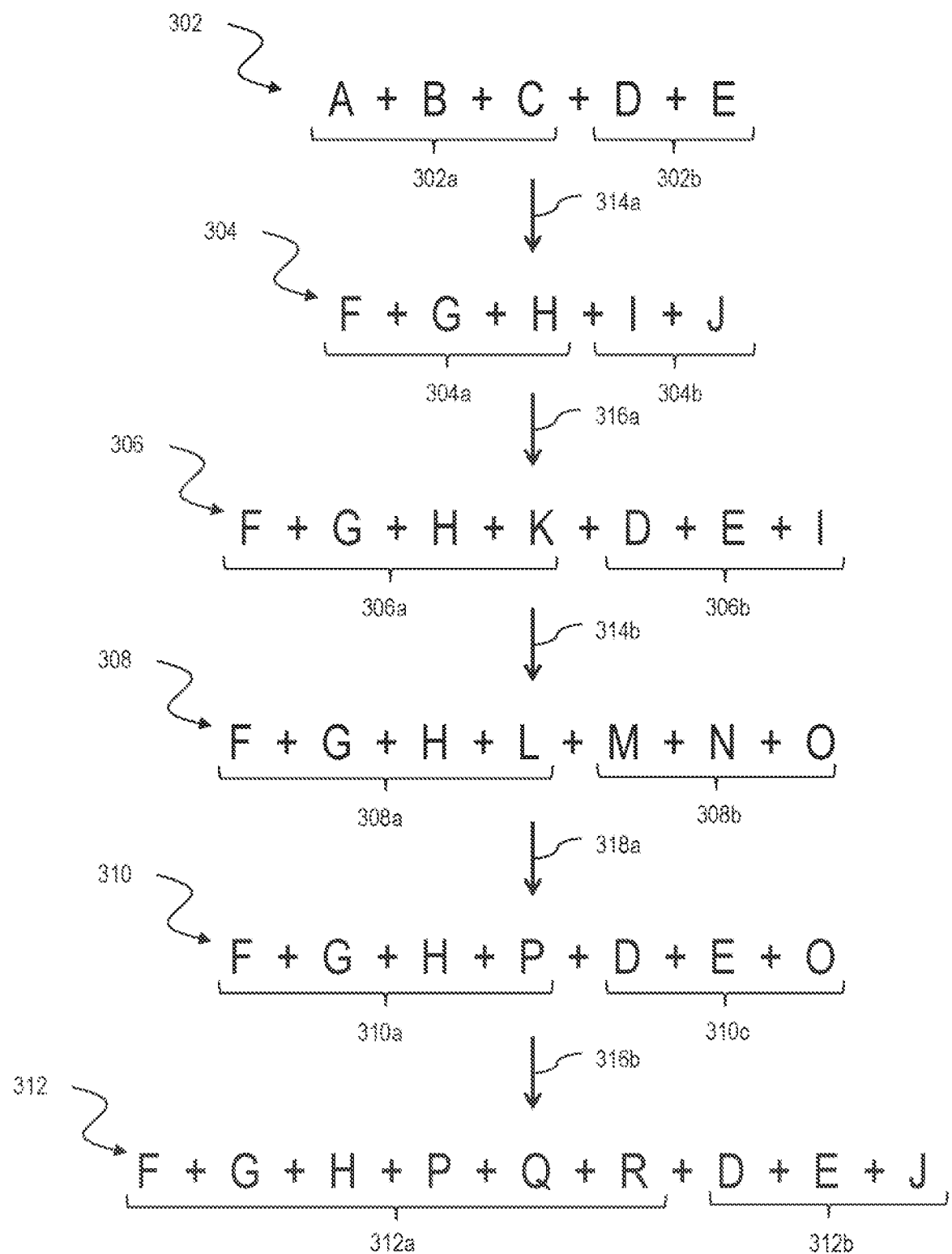
FIG. 3 is a diagram of a flow illustrating the processing of a plurality of tags that are relevant to a user according to aspects of the present disclosure.

FIG. 3 is a diagram of a flow 300 illustrating the processing of a plurality of tags that are relevant to a user over the course of a session of the computer-implemented method or algorithm 200a. The flow begins with a set of tags 302. The set of tags 302 is associated with an image that is presented to the user at the computer 102a through execution of the application 114a. Specifically, the display device 112a displays the image that is associated with the set of tags 302. As shown, the set of tags 302 includes primary tags 302a and secondary tags 302b. The tags can be any of the above-described tags; however, for purposes of convenience, the tags are represented by alphabetical characters. Thus, the primary tags 302a of the set of tags 302 include the tags A, B, and C, and the secondary tags 302b of the set of tags 302 include the tags D and E.

In response to the presentation of the image associated with the set of tags 302, the user indicates, for example, a preference for the physical object represented by the image. As described above, the preference may be indicated through the user interface device 110a. For purposes of explanation, the preference is represented by the arrow 314a in FIG. 3. Specifically, the arrow 314a represents a preference for the image associated with the set of tags 302 that is negative.

Based on the negative preference, the computer-implemented method or algorithm 200a processes the plurality of tags to determine a next set of tags and a next image that is associated with the next set of tags. The set of tags 304 represents the next set of tags determined by the computer-implemented method or algorithm 200a, and an image that is associated with the set of tags 304. The set of tags 304 includes the primary tags 304a F, G, and H, and the secondary tags 304b I and J. Because the user provided a negative preference in response to the physical object represented by the image that was associated with the set of tags 302, the set of tags 304 does not include any of the primary tags 302a. Specifically, the primary tags 302a of A, B, and C are removed from the plurality of tags that are processed to determine the next set of tags for the remainder of the session of the computer-implemented method or algorithm 200a.

Similar to above, in response to the presentation of the image associated with the set of tags 304, the user indicates a preference for the physical object represented by the image. For purposes of explanation, the preference is represented by the arrow 316a in FIG. 3. Specifically, the arrow 316a represents a preference for the image associated with the set of tags 304 that is positive.

Based on the positive preference, the computer-implemented method or algorithm 200a processes the plurality of tags to determine a next set of tags and a next image that is associated with the next set of tags. The set of tags 306 represents the next set of tags determined by the computer-implemented method or algorithm 200a, and an image that is associated with the set of tags 306. Because the user indicated a positive preference to the previous physical object represented by the image associated with the set of tags 304, the set of tags 306 includes the primary tags 306a F, G, H, and K, which are the primary tags 304a and the additional primary tag K. That is, the computer-implemented method or algorithm 200a builds upon the set of tags 304 based on the positive preference of the user by determining a set of tags that includes the previous primary tags and an additional primary tag (or more), and the corresponding image that the set of tags is associated with.

The set of tags 306 also includes the secondary tags 306b D, E, and I. Despite the user indicating a negative preference for the set of tags 302, which included the secondary tag D, the secondary tag D can be used again in a subsequent set of tags because the tag is a secondary tag. Alternatively, the secondary tags may also be removed from the plurality of tags that are processed, for the remainder of the session, to determine a next set of tags, instead of only the primary tags.

In response to the presentation of the image associated with the set of tags 306, the user indicates a preference for the physical object represented by the image. For ease of explanation, the preference is represented by the arrow 314b in FIG. 3. Specifically, the arrow 314b represents a preference for the image associated with the set of tags 306 that is negative.

Based on the negative preference, the computer-implemented method or algorithm 200a processes the plurality of tags to determine a next set of tags and a next image that is associated with the next set of tags. The set of tags 308 represents the next set of tags determined by the computer-implemented method or algorithm 200a, and an image that is associated with the set of tags 308. The set of tags 308 includes the primary tags 308a F, G, H, and L, and the secondary tags 304b M, N, and O. Because the user provided a negative preference in response to the physical object represented by the image that was associated with the set of tags 306, the set of tags 308 does not include the primary tag that was added between the set of tags 304 (e.g., last positive preference) and the set of tags 306, i.e., primary tag K. That is, the negative preference in response to the set of tags 306 is attributed to the addition of the primary tag K; thus, the primary tag K is removed from the plurality of tags for the remainder of the session such that no subsequent set of tags can include the primary tag K. The set of tags 308 also includes the secondary tags 308b M, N, and O.

In response to the presentation of the image associated with the set of tags 308, the user indicates a preference for the physical object represented by the image. For purposes of explanation, the preference is represented by the arrow 318a in FIG. 3. Specifically, the arrow 318a represents a preference for the image associated with the set of tags 308 that is neutral.

Based on the neutral preference, the computer-implemented method or algorithm 200a processes the plurality of tags to determine a next set of tags and a next image that is associated with the next set of tags. The set of tags 310 represents the next set of tags determined by the computer-implemented method or algorithm 200a, and an image that is associated with the next set of tags 310. The set of tags 310 includes the primary tags 310a F, G, H, and P, and the secondary tags 310b D, E, and O. Because the user provided a neutral preference in response to the physical object represented by the image that was associated with the set of tags 308, the set of tags 310 does not include the primary tag that was added between the set of tags 306 (e.g., last positive preference) and the set of tags 308, i.e., primary tag L. That is, the neutral preference in response to the set of tags 308 is attributed to the entire set of primary tags 308a, including the primary tag K and the primary tags F, G, and H. Thus, the set of primary tags 308a is removed from the plurality of tags that are processed, in the sense that the exact same set of primary tags 308a can never be presented to the user again. However, the primary tag L is not removed from the plurality of tags for the remainder of the session such that subsequent sets of tags can include the primary tag L, as long as the set of tags is not the exact set of primary tag 308a. The set of tags 310 also includes the secondary tags 310b D, E, and O.

In response to the presentation of the image associated with the set of tags 310, the user indicates a preference for the physical object represented by the image. For purposes of explanation, the preference is represented by the arrow 316b in FIG. 3. Specifically, the arrow 316b represents a preference for the image associated with the set of tags 310 that is positive.

Based on the positive preference, the computer-implemented method or algorithm 200a processes the plurality of tags to determine a next set of tags and a next image that is associated with the next set of tags. The set of tags 312 represents the next set of tags determined by the computer-implemented method or algorithm 200a, and an image that is associated with the set of tags 312. Because the user indicated a positive preference to the previous physical object represented by the image associated with the set of tags 310, the set of tags 312 includes the primary tags 310a F, G, H, P, Q, and R, which are the primary tags 310a and the additional primary tags Q and R. That is, as described above, the computer-implemented method or algorithm 200a builds upon the positive preference of the user by determining a set of tags that includes the previous primary tags and one or more additional primary tags, and the corresponding image that the set of tags is associated with.

The flow 300 continues until the user selects a physical object that is represented by a currently presented image, which corresponds to the last image that is presented within the above sequence of images, as a physical object that the user would like to obtain. Alternatively, the flow 300 continues until the session is ended and restarted, for the reasons discussed above. In each case, when a session of the computer-implemented method or algorithm 200a is started or restarted, the plurality of tags and images that are processed are reset such that the tags and sets of tags that were removed from the plurality of tags are inserted back into the plurality of tags for processing.

The following figures use any of the aspects described above in connection with the foregoing FIGS. 1-3. These figures and accompanying description lay out some of the foundational aspects of the present disclosure, which the following figures show as mere exemplars of the many implementations contemplated by the present disclosure.

FIGS. 4A-4G illustrate user interfaces (UIs) 400a-400g, respectively, that are presented on a computer 102a as part of an application 114a executed on the computer 102a for analyzing tags associated with a sequence of images presented to a user to guide a user to a current object of interest. Referring to FIG. 4A, when starting a session of the computer-implemented method or algorithm, images appear one at a time and users interact with the images to populate a dynamic sequence of images. According to the various configurations of the system 100, the images are pushed by the server 106, from the database 108, to the application 114a on the computer 102a one at a time, and in response to, for example, indications of preferences by a user. However, as discussed above, in some aspects, the images can be pushed by the server 106 in numbers that correspond to the number of selectable preferences a user can provide in response an image. For example, in response to a user being able to select a positive preference or a negative preference, two images are pushed to the computer 102a, prior to the user providing the preference. In response to a user being able to select a positive preference, a negative preference, or a neutral preference, three images are pushed to the computer 102a, prior to the user providing the preference. Alternatively, the images may be retrieved from the database 108 by the application 114a, either directly or through the server 106. Alternatively, the images may be contained within the application 114a on the computer 102a.

FIG. 4A illustrates the main UI 400a of the computer-implemented method or algorithm 200a. As shown, the UI 400a includes an image 402a (e.g., image A). The image 402a represents a physical object (e.g., physical object A). Below the image 402a are user interface elements 404a and 404b. Specifically, the user interface elements 404a and 404b allow a user to enter inputs associated with the image 402a, and the corresponding physical object represented by the image, for the user to provide a preference for the physical object represented by the image 402a. For example, the user interface element 404a is an icon of an X, which corresponds to a negative preference, and the user interface element 404b is an icon of a checkmark, which corresponds to a positive preference. The UI 400a also includes a main toolbar 406 that allows the user to navigate within the application 114a. Within the main toolbar 406 are icons corresponding to functions of the application 114a, including a Home icon 406a, a Source icon 406b, a Search icon 406c, and a My Profile icon 406b. The Search icon 406a initiates a session of the computer-implemented method or algorithm 200a that begins the method or algorithm for analyzing tags associated with a sequence of images presented to a user to present a current object of interest of the user. Thus, prior to the UI 400a being presented in the display device 112a of the computer 102a, the user, for example, selected the Search icon 406a.

FIG. 4B shows a subsequent user interface after the UI 400a. Specifically, upon the user selecting one of the user interface elements 404a or 404b, the UI 400a transitions to UI 400b. UI 400b includes a new image 402b (e.g., image B). Like image 402a, the image 402b represents a physical object (e.g., physical object B). By way of example, the user may have selected the user element 404a to indicate that the user has a negative preference (e.g., dislike) for the physical object represented by the image 402a. In response, the computer-implemented method or algorithm 200a determined a next set of tags that does not include tags from the previous set of tags associated with the image 402a, and determined an image (e.g., image 402b) that is associated with the next set of tags to present to the user. Accordingly, the image 402b does not have the same primary tags as the primary tags associated with the image 402a.

FIG. 4C shows a subsequent user interface after the UI 400b. The UI 400c of FIG. 4C may be after several rounds of the computer-implemented method or algorithm 200a selecting next sets of tags and images associated with the next sets of tags, and receiving inputs from the user indicating preferences for the physical objects represented by the images. By way of explanation, the UI 400c may be presented after an N number of images were previously presented. Thus, the UI 400c includes a new image 402c (e.g., image C). Like images 402a and 402b, the image 402c represents a physical object (e.g., physical object C).

FIG. 4D shows a detailed view UI 400d associated with the image 402c in FIG. 4C. By way of example, the UI 400c transitions to the UI 400d by the user selecting the image 402c in the UI 400c. The UI 400d includes the same image 402c in FIG. 4C. In addition, the UI 400d includes user interface elements 408a and 410a. User interface element 408a corresponds to a title or caption associated with the image 402c. The title or caption of the user interface element 408a is a text string that describes the physical object that is represented by the image 402c. User interface element 410a lists the tags that are associated with the image 402c. The user interface element 410a allows a user to directly see the tags that are associated with the image 402c and, therefore, also associated with the physical object that is represented by the image 402c.

FIG. 4E shows a UI 400e that includes a recommendation for a source based on the currently presented image 402d, which is presented based on the computer-implemented method or algorithm 200a. For example, the user may have indicated a negative preference or dislike in response to being presented the image 402c. Based on reverting back to the tags that were last associated with a positive response (for example, 402b), the computer-implemented method or algorithm 200a may have determined the image 402d as the next image to present to the user. Similar to the UI 400d, the UI 400e includes a detailed view associated with the currently presented image 402d. As shown, the image 402d shows a digital photograph of Image D the user interface element 408b shows the caption Image D. The UI 400e further includes the user interface element 410b, which provides the tags that are associated with the image 402d. Further, the UI 400e includes the user interface element 412. The user interface element 412 provides an indication of a number sources within the area, for example, defined by the location of the user, the computer 102a, or both, that provide the physical object (e.g., physical object D) that is associated with the image 402a. As shown, there are 15 sources within a threshold location of the user that provide the physical object D that is associated with the image 402d.

The user interface element 412 may be presented to the user within the UI 400e in response to the user providing an indication that the user is interested in obtaining the physical object associated with the image 402d. Such an indication can be provided according to various methods, such as the user double tapping or selecting the image 402d. In response, the application 114a presents the user interface element 412 within the UI 400e. Thus, once a user is guided to a physical object that the user is interested in, the computer-implemented method or algorithm 200a provides information on sources that provide the physical object. In this case, the entities are the 15 sources. In response to the user selecting the user interface element 412, the application 114a causes a transition from the UI 400e to the UI 400f.

FIG. 4F shows the UI 400f, which includes a list of sources (e.g., Sources 1-7) that offer the physical object for which the user requested additional information. The UI 400f includes a list of sources 414a-414g, that provide the physical object associated with the image 402d. From the UI 400f, the user is able to choose a specific source from the list of sources 414a-414g. Upon selecting a source, such as the first source associated with the first user interface element 414a, the application 114a causes a transition from the UI 400f to the UI 400g.

Figure 4H:
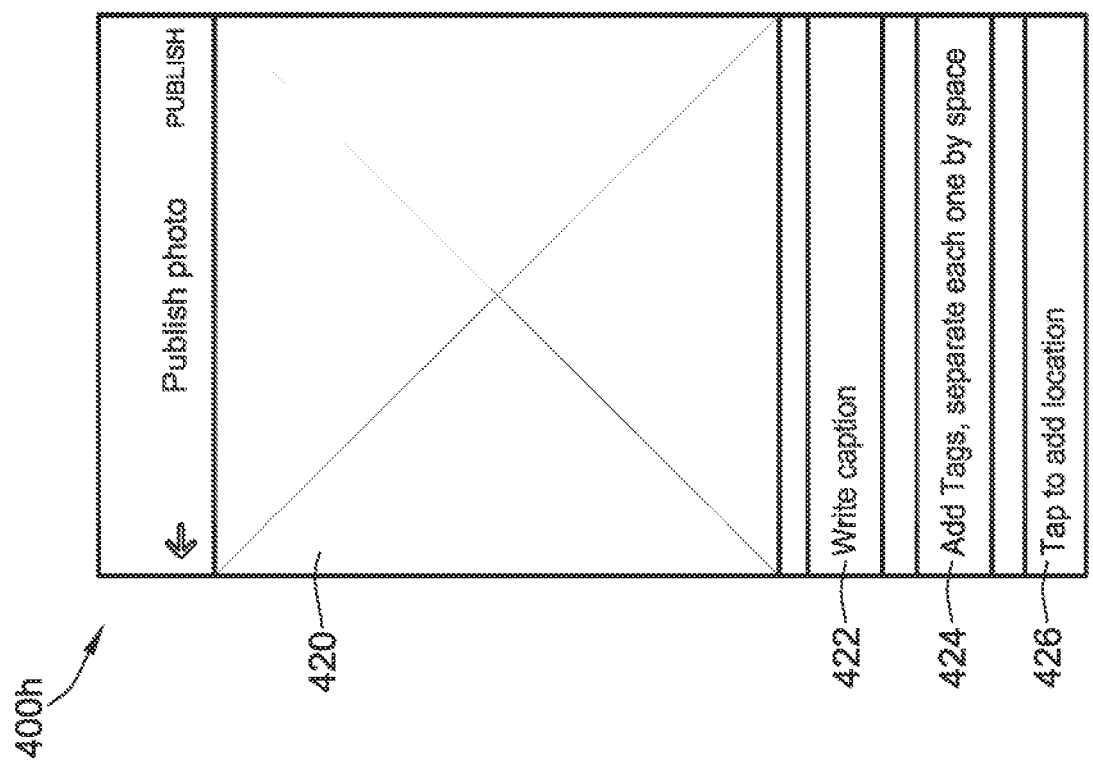
FIG. 4H illustrates a user interface for uploading an image according to aspects of the present disclosure.
Figure 4G:
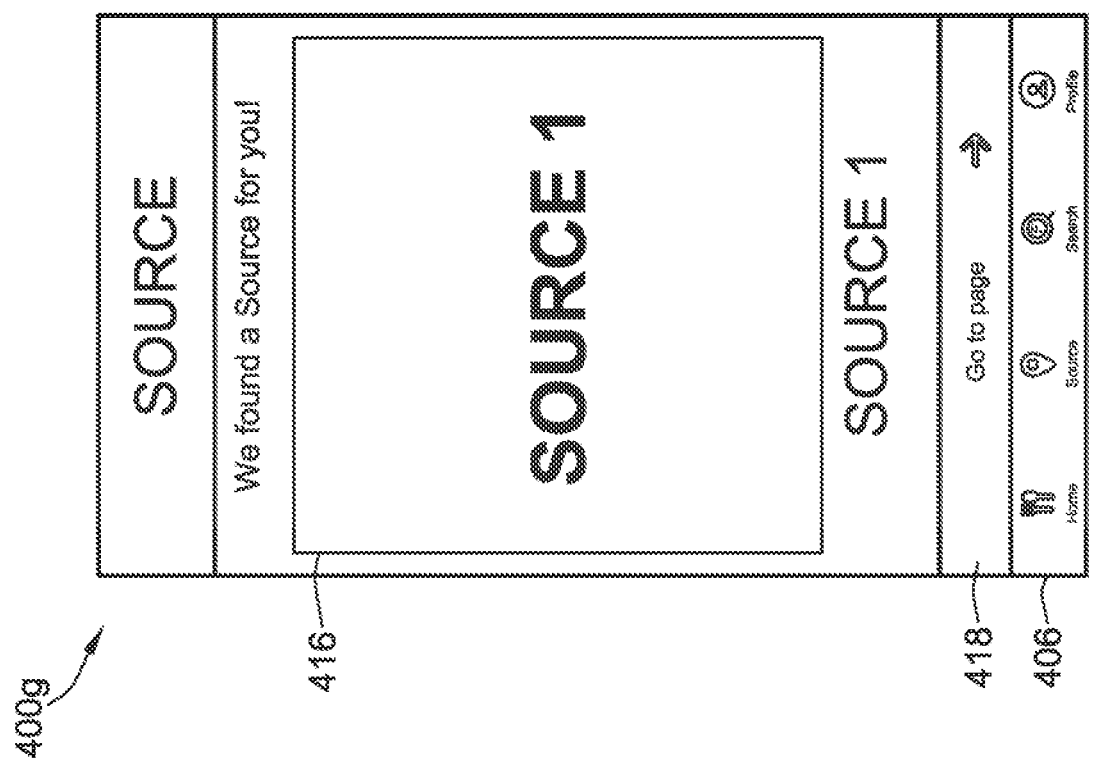
FIG. 4G illustrates another user interface of a computer-implemented method or process of analyzing tags associated with a sequence of images presented to a user to present a current interest of the user according to aspects of the present disclosure.

FIG. 4G shows a UI 400g that provides information regarding a specific source that offers the physical object associated with the image 402d. Below the image 416, the UI 400g includes the name of the source (e.g., Source 1). The UI 400g also includes a user interface element 418. The user interface element 418 can be associated with a hyperlink to for additional information on the source. Alternatively, the user interface element 418 may direct the user to a landing site within the application for the source. The landing site for the source may provide additional information regarding the source, such as the information that is contained with the profile stored within the database 108.

FIG. 4H shows a UI 400h for a user to upload and associate an image of a physical object into the system 100, such as stored within the database 108 of the system 100. The UI 400h includes an area 420 to display the image that will be associated with the physical object. The image can be obtained according to various methods, such as a camera integrated within the computer 102a, such as in the case of a smartphone, or by linking to an image on the Internet or saved in a memory device of the computer 102a. Similar to the UI 400f, the UI 400h also includes a user interface element 422 that allows a user to insert a title or a caption for the image. The UI 400h also includes a user interface element 424 to associate the image within the area 420 with one or more tags that describe the physical object represented by the image. The UI 400h also includes a user interface element 426 to associate a location with the image and the physical object. The location can either be determined automatically, such as through components and/or modules within the computer 102a (e.g., Global Positioning System receivers), or can be manually entered by the user.

Figure 4J:
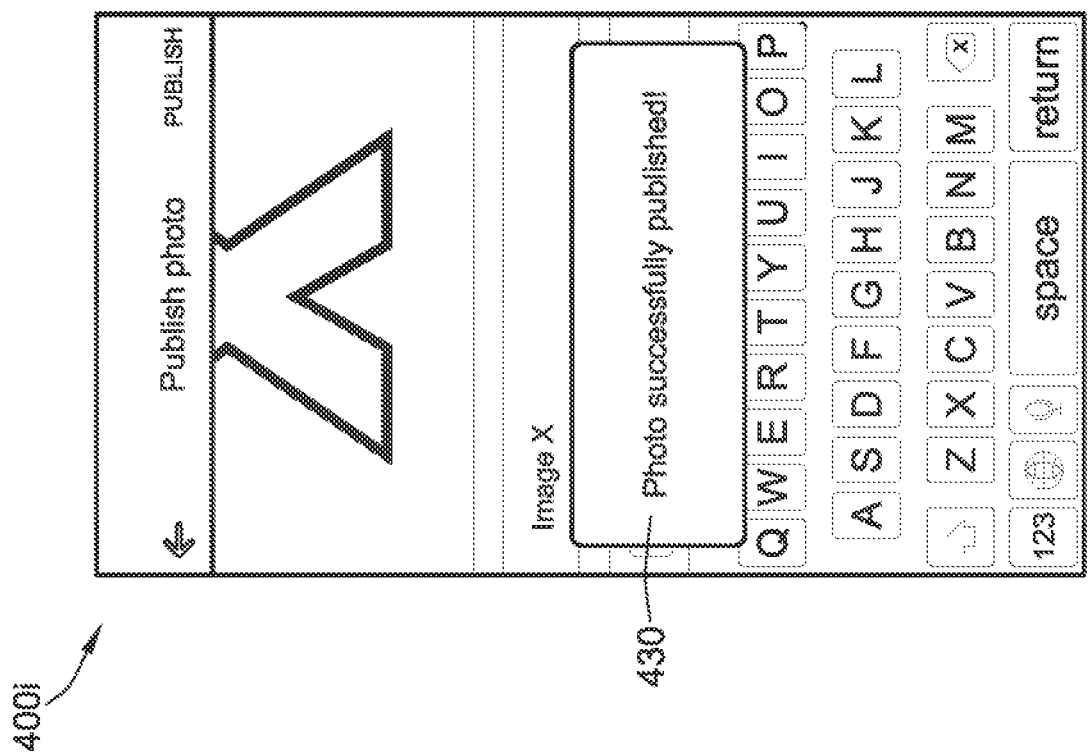
FIG. 4J illustrates another user interface for uploading an image according to aspects of the present disclosure.
Figure 4I:
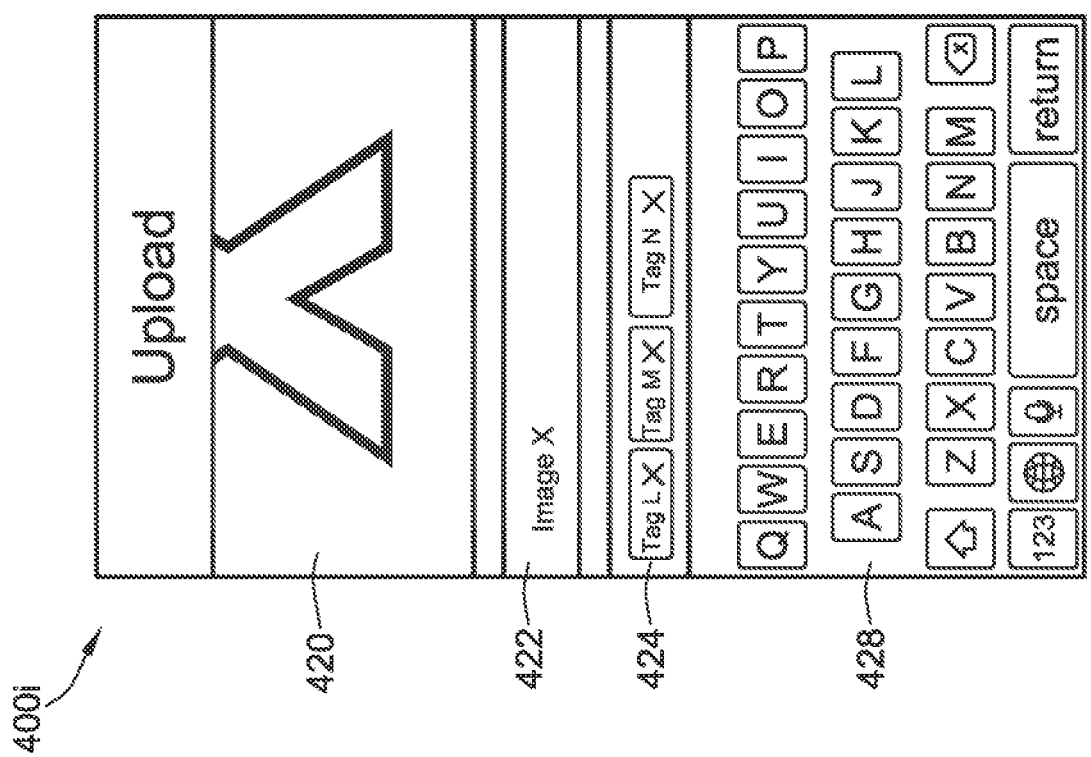
FIG. 4I illustrates another user interface for uploading an image according to aspects of the present disclosure.

FIG. 4I illustrates the UI 400i as the user enters information within the user interface elements 422 and 422. To select the tags and enter the caption, the UI 400i includes a graphical representation of an electronic keyboard 428. However, the user can enter the text according to various other user interface devices. Once the user has completed entering the information, the image is uploaded to the database 108. FIG. 4J shows the UI 400j that includes the user interface element 430, which indicates a successful upload of the image and the associated information, such as the tags, the caption, and the location.

Figure 4L:
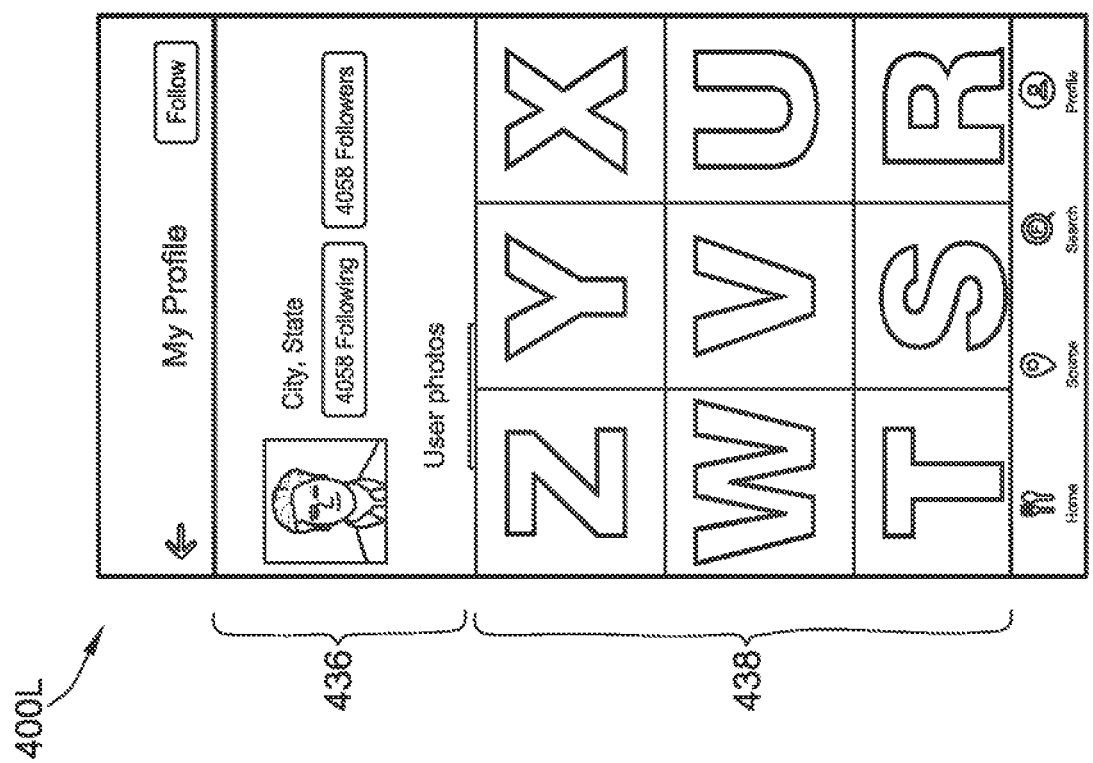
FIG. 4L illustrates a user interface for visualizing a profile of a user according to aspects of the present disclosure.
Figure 4K:
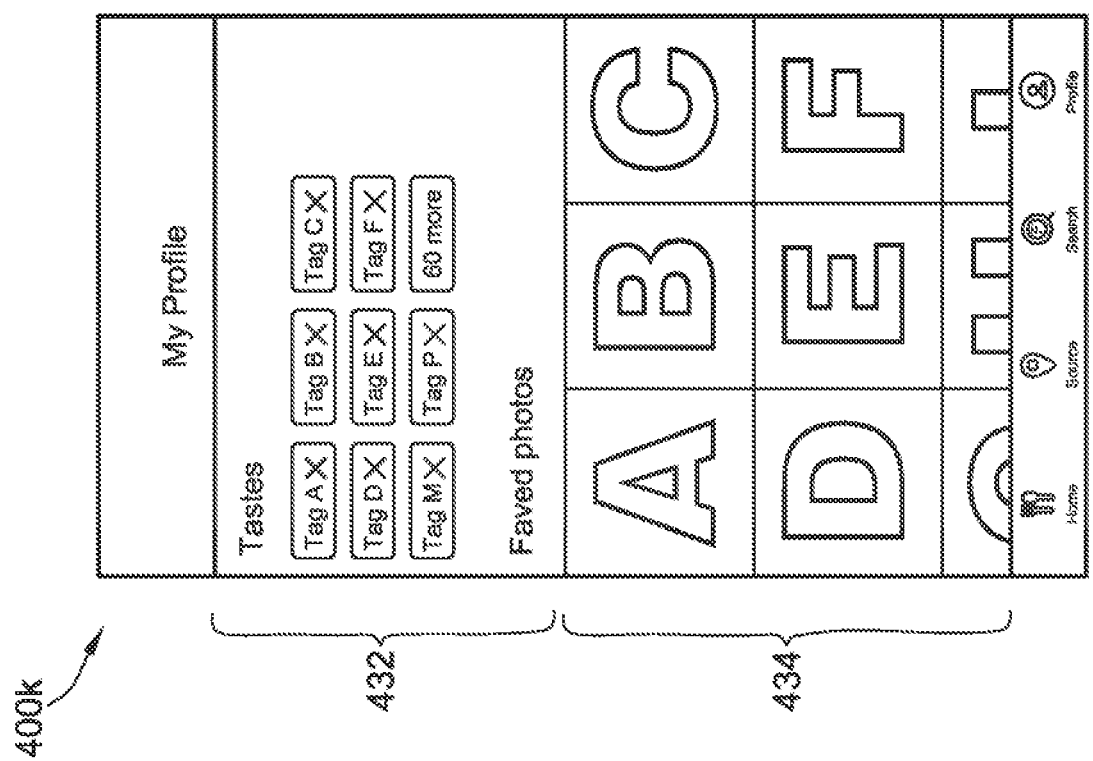
FIG. 4K illustrates a user interface for visualizing a profile of a user according to aspects of the present disclosure.

FIGS. 4K and 4L show user interfaces associated with a user viewing aspects of the user's profile. Specifically, FIG. 4K shows UI 400k associated with a user profile, including the tags that the user is associated with based on the user interface element 432. As shown, the user profile indicates that the user is associated with the tags Tag A, Tag B, Tag C, Tag D, Tag E, Tag F, Tag M, Tag P, as well as 60 other tags (e.g., 60 more). The tags are associated with the user by the user manually selecting certain tags from all of the tags that are stored in the database 108 that the user has a positive preference for (e.g., likes). Alternatively, the tags are associated with the user implicitly by the user's interaction with the tags over time, such as the user having the habit of selecting images and/or physical objects that the user prefers that are associated with the listed tags in the user interface element 426. The UI 400i also includes images (e.g., digital photographs) that the user has provided a positive preference for (e.g., liked) during interaction with the application 114a.

FIG. 4L includes the UI 400l that shows at least some additional aspects of the user's profile. For example, the UI 400l includes user interface elements 436 and 438. The user interface element 436 includes social media information regarding the user, such as an icon of the user, the user's location (e.g., city and state), and how many users the user is following and are following the user. The user interface element 438 includes images that the user has uploaded into the system 100, such as through the flow illustrated in FIGS. 4H-4J. The UI 400l can include other information within the system 100, not just the information specifically referenced herein with respect to FIGS. 4A-4L. For example, the UI 400l can include a feature for users called The Top 100, which highlights the top rated images and/or physical objects associated with the images at any given moment. The Top 100 images can be out of all of the images stored within the database 108, all of the images within the database 108 that are relevant to the user based on the images being associated with tags that the user has liked, or all of the images of physical objects that are provided within a pre-defined area surrounding the user's current location. The images representing the physical objects with the most positive preferences will be featured on The Top 100, which provides users the incentive to upload physical objects that are their favorite physical objects. The Top 100 list allows users to gain attention. In the social media realm, the applications 114a, 114b allow users to attract more followers as well as support, for example, their favorite sources of physical objects. The Top 100 lists will also be active, allowing users to select an image within The Top 100 list to be taken to a page associated with a profile of the source that provides the physical object represented by the image.

The physical objects as described herein can be any physical, tangible objects that the user may currently have a desire for, while not being able to describe or put into words the current desire, such as the user having latent desire. For example, a user may know that he or she wants something, but cannot determine what he or she wants. Moreover, the physical object can represent an object that the user does not currently have or an experience that the user would like to experience, but that the user can obtain through, at, or using one or more sources. Further, the sources as described herein can be any physical, tangible source that provides the physical objects or experiences depicted in the images. For example, the physical, tangible source can be a dealer or purveyor of the physical objects.

While this disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention(s) as defined by the appended claims.

Each of these embodiments, and obvious variations thereof, is contemplated as falling within the spirit and scope of the claimed invention(s), which are set forth in the following claims. Moreover, the present concepts expressly include any and all combinations and sub-combinations of the preceding elements and aspects.

What is claimed is:

1. A computer-implemented method comprising:

transmitting, from one or more computer devices, one or more first electronic images, from among a plurality of electronic images stored on the one or more computer devices, to an electronic device associated with a user, each electronic image of the one or more first electronic images representing one or more first possible interests of the user and being associated with a corresponding set of tags from a pool of tags, each tag of the pool of tags representing an attribute of the one or more first possible interests of the user;

receiving, by the one or more computer devices, an input from the user indicating one or more preferences for the one or more first possible interests represented by the one or more first electronic images;

processing, by the one or more computer devices, at least a subset of the pool of tags based on the one or more preferences and the corresponding set(s) of tags for the one or more first electronic images to generate one or more next set of tags, the processing comprising:

determining weightings of tags from the at least the subset of the pool of tags based, at least in part, on a number of times each tag of the tags from the at least the subset of the pool of tags is associated with at least one of a positive preference or a negative preference by the user, the each tag of the tags from the at least the subset of the pool of tags being associated with at least one positive preference and at least one negative preference by the user; and determining the one or more next set of tags based on the one or more next set of tags including at least one tag of the tags from the at least the subset of the pool of tags, wherein the one or more next set of tags includes a highest weighted tag from the at least the subset of the pool of tags;

determining, by the one or more computer devices, one or more next electronic images from the plurality of electronic images associated with the one or more next set of tags, the one or more next images representing one or more next possible interests of the user, different from the one or more first possible interests, and the one or more next set of tags describing or characterizing attributes of the one or more next possible interests represented by the one or more next electronic images; and generating a sequence by repeating the transmitting, the receiving, the processing, and the determining with the one or more next electronic images in place of the one or more first electronic images a plurality of times during a session until the user indicates at least one electronic image of the one or more next electronic images is a current interest of the user.

2. The method of claim 1, in response to the input for the one or more preferences for the one or more first possible interests represented by the one or more first electronic images being negative, further comprising negatively weighting each tag of the corresponding set(s) of tags from the pool of tags.

3. The method of claim 2, wherein the negative weighting of at least one tag from the corresponding set(s) of tags removes the at least one tag from the subset of the pool of tags for at least one iteration of the generating of the sequence.

4. The method of claim 2, wherein the negative weighting of at least one tag from the corresponding set(s) of tags removes the at least one tag from the subset of the pool of tags from a remainder of the session of determining the current interest of the user.

5. The method of claim 1, further comprising:
determining one or more interactions of the user with the one or more first electronic images, one or more tags from the pool of tags, or a combination thereof,
wherein the weighting is based, at least in part, on the one or more interactions.

6. The method of claim 1, in response to the input for the one or more preferences for the one or more first possible interests represented by the one or more first electronic images being negative, further comprising positively weighting each tag of the corresponding set(s) of tags from the pool of tags.

7. The method of claim 1, further comprising determining, by the one or more computer devices, a plurality of tags specific to the user, from among the pool of tags, based on each tag of the plurality of tags specific to the user being associated with a profile of the user.

8. The method of claim 1, wherein the processing, by the one or more computer devices, is of at least a subset of the plurality of tags specific to the user from among the pool of tags.

9. The method of claim 1, wherein the weighting is based, at least in part, on the profile of the user.

10. A computer-implemented method comprising:
receiving, from an electronic device associated with a user, an indication of an instance of an application executed on the electronic device, wherein the application, together with one or more computer devices, is configured to direct the user to a current interest of the user;
causing a presentation on a display of the electronic device of one or more first electronic images, from among a plurality of electronic images stored on the one or more computer devices, each electronic image of the one or more first electronic images representing one or more first possible interests of the user and being associated with a corresponding set of tags from a pool of tags, each tag of the pool of tags representing an attribute of one or more possible interests of the user;
processing, by the one or more computer devices, at least a subset of the pool of tags to determine a first potential set of tags corresponding to a positive preference from the user for at least one corresponding interest represented by at least one of the one or more first electronic images and a second potential set of tags corresponding to a negative preference from the user for at least one corresponding interest represented by at least one of the one or more first electronic images, prior to receiving an input from the user indicating a preference for the one or more first electronic images, the processing comprising:
determining weighting of tags from the at least the subset of the pool of tags based, at least in part, on a number of times each tag of the tags from the at least the subset of the pool of tags is associated with at least one of a positive preference or a negative preference by the user, the each tag of the tags from the at least the subset of the pool of tags being associated with at least one positive preference and at least one negative preference by the user; and
determining the one or more next set of tags based on the one or more next set of tags including at least one tag of the tags from the at least the subset of the pool of tags, wherein the one or more next set of tags includes a highest weighted tag from the at least the subset of the pool of tags;
transmitting, from the one or more computer devices, at least one first potential electronic image and at least one second potential electronic image, prior to receiving the input, the at least one first potential electronic image being associated with the first potential set of tags and the at least one second potential electronic image being associated with the second potential set of tags;
receiving, from the electronic device, the input from the user;
causing, by the one or more computer devices, a presentation of the at least one first potential electronic image or the at least one second potential electronic image based on the preference for the one or more first electronic images being the positive preference or the negative preference; and
generating a sequence of electronic images presented to the user on the display of the electronic device by repeating the processing, the transmitting, the receiving the input from the user, and the causing of the presentation of the at least one first potential electronic image or the at least one second potential electronic image in place of the one or more first electronic images a plurality of times during a session of the instance of the application executed on the electronic device until the user indicates the at least one first potential electronic image or the at least one second potential electronic image is the current interest of the user.

* * * * *